(12) United States Patent
Lawrence

(10) Patent No.: US 10,728,466 B2
(45) Date of Patent: Jul. 28, 2020

(54) VIDEO MULTIVIEWER SYSTEMS

(71) Applicant: Crystal Vision Limited, Wittlesford, Cambridge (GB)

(72) Inventor: Richard Trevor Lawrence, Little Gransden (GB)

(73) Assignee: Crystal Vision Limited, Cambridge (GB)

( * ) Notice: Subject to any disclaimer, the term of this patent is extended or adjusted under 35 U.S.C. 154(b) by 0 days.

(21) Appl. No.: 16/072,615

(22) PCT Filed: Jan. 26, 2017

(86) PCT No.: PCT/GB2017/050204
§ 371 (c)(1),
(2) Date: Jul. 25, 2018

(87) PCT Pub. No.: WO2017/137722
PCT Pub. Date: Aug. 17, 2017

(65) Prior Publication Data
US 2019/0045141 A1    Feb. 7, 2019

(30) Foreign Application Priority Data
Feb. 12, 2016   (GB) .................................. 1602543.9

(51) Int. Cl.
*H04N 21/2381*   (2011.01)
*H04N 5/268*   (2006.01)
(Continued)

(52) U.S. Cl.
CPC ............. *H04N 5/2624* (2013.01); *H04B 1/00* (2013.01); *H04N 5/268* (2013.01);
(Continued)

(58) Field of Classification Search
CPC .... H04N 5/2624; H04N 5/2628; H04N 5/268; H04N 21/21805; H04N 21/2381; H04N 21/2662; H04B 1/00
(Continued)

(56) References Cited

U.S. PATENT DOCUMENTS 5,365,278 A    11/1994   Willis
5,995,146 A *  11/1999   Rasmussen ...... H04N 21/23436
                                                         348/461
(Continued)

FOREIGN PATENT DOCUMENTS

JP    2008259074 A    10/2008

OTHER PUBLICATIONS

English language abstract of Japan Patent Publication No. JP 2008259074, European Patent Office, Oct. 23, 2008.
(Continued)

*Primary Examiner* — Jefferey F Harold
*Assistant Examiner* — Omer Khalid
(74) *Attorney, Agent, or Firm* — Dascenzo Intellectual Property Law, P.C.

(57) ABSTRACT

A video multiviewer system is provided for use in the simultaneous viewing, at a viewing location, of video streams from multiple video sources, and comprises video prescaler means for deriving from each of multiple video input streams a respective set of one or more scaled video streams, the or at least some of the scaled video streams being of a different scale from that of the video input stream, the system further comprising a video stream combiner programmed or arranged to combine selected scaled video streams to enable the selected scaled video streams to be displayed at the viewing location, wherein the combiner and prescaler means are programmed or arranged to be linked together, in use, by means of a packet switched network via
(Continued)

which said selected scaled video streams are relayed to the video stream combiner. In a corresponding method of simultaneously presenting, at a viewing location, video streams from multiple sources, a respective set of one or more scaled video streams is generated from each of a number of input video streams and is fed to a packet switched network from which selected members of the sets of scaled streams are received and combined into a combined video stream for display on a displaying device.

18 Claims, 13 Drawing Sheets

(51) Int. Cl.
  *H04N 21/218* (2011.01)
  *H04N 21/2662* (2011.01)
  *H04N 5/262* (2006.01)
  *H04B 1/00* (2006.01)
(52) U.S. Cl.
  CPC ..... *H04N 5/2628* (2013.01); *H04N 21/21805* (2013.01); *H04N 21/2381* (2013.01); *H04N 21/2662* (2013.01)

(58) Field of Classification Search
  USPC .......................................... 348/588
  See application file for complete search history.

(56) References Cited

U.S. PATENT DOCUMENTS

| | | | |
|---|---|---|---|
| 2005/0008240 A1* | 1/2005 | Banerji ................. | H04N 19/89 382/238 |
| 2009/0256863 A1* | 10/2009 | Komorowski ............ | G06T 3/40 345/660 |
| 2010/0002070 A1* | 1/2010 | Ahiska ............... | H04N 5/23206 348/36 |
| 2013/0201181 A1* | 8/2013 | Lee .......................... | G09G 5/14 345/419 |
| 2016/0182834 A1* | 6/2016 | Sivasankaran ....... | H04N 21/482 386/230 |

OTHER PUBLICATIONS

Search Report issued in connection with United Kingdom Patent Application No. GB 1503615.5, 2 pages, United Kingdom Intellectual Property Office, dated Jul. 18, 2015.

* cited by examiner

A plurality of reduced-scale images at 2/3, ½, 1/3, ¼, 1/6, 1/8, 1/12, 1/16

A possible tiling based on a plurality of reduced scale images with scale factors of 2/3, 1/3, 1/6 and 1/12

A possible tiling based on a plurality of reduced scale images with a common scale factor of two A different possible tiling based on a plurality of reduced scale images with a common scale factor of two

VIDEO MULTIVIEWER SYSTEMS

FIELD OF THE INVENTION

This invention relates to a video multiviewer system and to a method of simultaneously presenting, at a viewing location, video streams from multiple sources. The invention also lies, individually, in a prescaler and in a combiner for use in such a system.

BACKGROUND TO THE INVENTION

Broadcast television production and transmission often involves simultaneous display of the video content of multiple video streams, to allow people to see what is in each stream. This might be images from the different cameras and other video sources in a studio during the production process, or the many channels being processed for transmission in a playout facility. Historically, with analogue television signals, this monitoring was achieved with a 'wall' of multiple small display devices ('monitors') each showing the image content of a single video stream. These would be used for basic content monitoring: allowing a check of what each camera is pointing at, or whether the playout device for each channel is operating correctly. A small number of larger monitors would be provided for more stringent quality checks and to aid creative decision making. The signals to the monitors would typically be connected through a crosspoint switch, also known as a router, allowing any signal source to be connected to any monitor.

This approach can also be used with television signals digitised as continuous streams of data, such as the 'SDI' signals widely used in current television production and playout systems.

Multiviewers enable different video streams from a large number of different sources to be brought together and viewed at a common viewing location, typically in real time. Such systems find application in closed circuit television-based security (in which feeds from a large number of cameras need to be viewed simultaneously) but are particularly useful in a broadcasting environment in which there is a requirement that somebody can monitor a large number of video sources simultaneously. To that end, it is known to put a number of videos on a single screen which is, in effect, sub-divided into separate windows, each displaying a respective video stream. This approach is becoming more popular and useful with the increasing availability of large display screens.

A multiviewer typically combines a number of video inputs to prepare a composite video output. A difficulty in constructing a multiviewer is that a large number of video signals need to be connected to it, and these require a large amount of bandwidth. Current devices have a limit to the number of input video streams and output TV screens that they can therefore handle. Additionally or alternatively, these transmission requirements can place constraints on the location of the multiviewer relative to the sources of the video streams.

SUMMARY OF THE INVENTION

According to a first aspect of the invention, there is provided a video multiviewer system for use in the simultaneous viewing, at a viewing location, of video streams from multiple video sources, the system comprising video prescaler means for deriving from each of multiple video input streams a respective set of one or more scaled video streams, the or at least some of the scaled video streams being of a different scale from that of the video input stream, the system further comprising a video stream combiner programmed or arranged to combine selected scaled video streams to enable the selected scaled video streams to be displayed at the viewing location, wherein the combiner and prescaler means are programmed or arranged to be linked together, in use, by means of a packet switched network via which said selected scaled video streams are relayed to the video stream combiner.

Preferably the or at least some of the scaled video streams are of a reduced scale relative to the video input stream.

Preferably, the prescaler means and combiner are programmed or arranged to be linked together by means of a packet switched Internet Protocol (IP) network, for example, the Internet, or a packet switched local area network.

The invention enables the various component functions of the system to be provided anywhere on the network, at the user's convenience.

In addition, by using a packet switched network to relay the selected scaled video streams, the invention exploits the inherent efficiency of such a network, as a result of which the bandwidth requirements for operating the system can be minimised. The combiner can be provided with sufficient video data to produce a video output of the required quality, with only selected scaled video streams propagating across the network to the combiner.

Preferably, the combiner is programmed or arranged to provide a combined video data output stream, containing the video data from the selected scaled video streams, for display on a common display device.

Such a device may, for example, comprise a video display screen (e.g. an LCD, LED or OLED screen) or a video projector.

Preferably, the video prescaler means is operable to derive, from at least one of the video input streams, a scaled video stream all the frames of which are scaled by the same amount.

Preferably the video prescaler means is operable to derive, from at least one of the video input streams, a scaled video stream, having a constant frame rate.

The use of constant scaling simplifies the operation of the multiviewer system since it reduces the amount of data, on the scaling, that needs to be generated and transmitted through the network and enables the same scaling algorithm to be used to create all the frames of a scaled stream. The constant frame rate enables the scaled stream to be generated by sampling the input stream at equal intervals and avoids the problems of visual artefacts that may be introduced if a variable frame rate were to be used.

Preferably, all of the scaled streams have the same frame rate.

Preferably, the prescaler means comprises at least one video stream prescaler programmed or arranged to derive a set of multiple scaled video streams, simultaneously from a respective video input stream, and to feed the scaled video streams to the network, each scaled video stream containing some or all of the video data from the video input stream, scaled by an amount that is different from the amounts by which the other scaled streams of the set are scaled.

Because the prescaler means makes available multiple scaled versions of the input video streams simultaneously, the combiner can change the size, as well as the source, of the scaled video streams that it uses without having to co-ordinate any such change with the prescaler means. Nor is network bandwidth wasted on the transmission of redundant stream packets, since the network will have an established means of discarding unwanted streams, and only the selected streams will be propagated over the network to the combiner.

Preferably, the prescaler means is so programmed or arranged that the scaled video streams of the set are scaled to proportions, relative to the video input stream, that define one or more geometric series.

If each of all of the sets of scaled streams available to a combiner satisfy this requirement, this will facilitate the efficient tiling of a display for a combined video stream, produced by the combiner, with an integral number of windows each of some or all of which display a respective scaled stream.

Preferably where the video stream prescaler is one of a plurality of such prescalers, all the sets are scaled in terms of height and width, to proportions that define the same geometric series.

Preferably, the common ratio of the or each series is ½, ⅔ or ¾.

Preferably, the prescaler means and combiner are programmed or arranged to co-operate over the network in accordance with a multi-casting protocol, or equivalent method, by means of which the scaled video streams are selectively received from the network by the combiner.

This provides an efficient way of propagating the scaled video streams over the network whilst facilitating expansion of the system to include further combiners and/or prescalers.

Preferably, the prescaler is one of a plurality of such prescalers of the system and/or the combiner is one of a plurality of such combiners of the system.

The system according to the invention is particularly suitable for such an arrangement since the network will already be configured for the simultaneous transmission of feeds to a number of different addresses. The scaled streams can be readily shared by combiners without having to modify the normal operation of the network. Furthermore, since the use of additional combiners will not interact in terms of processing demand on the prescaler means, the system is easy to enlarge.

Preferably, the combiner has a plurality of outputs and is programmed or arranged to produce combined video streams in a number of different formats, each at a respective output of the combiner.

The formats may, for example, be packetised data in accordance with standard RFC1475, and SDI data stream according to SMPTE259, SMPTE292 or SMPTE424, which stream is then packetised to SMPTE2022 and transmitted to an interface module, for example, an interface which provides an output for supplying the packetised video data stream to an Ethernet network.

The SDI data stream may additionally or alternatively be provided to an SDI interface having an output for transmission and processing to an SDI-based studio system. The SDI stream may additionally or alternatively be supplied to an SDI to HDMI transmitter having an output for an HDMI data stream suitable for driving a local display device.

According to a second aspect of the invention, there is provided a prescaler for a multiviewer system according to the first aspect of the invention, the prescaler being programmed or arranged to derive, from an input video stream, one or more scaled video streams and to feed said one or more scaled video streams to a packet switched network, for reception by a video stream combiner of the multiviewer system.

Preferably, the prescaler is programmed or arranged to generate a set of scaled video streams, each derived from said input video stream, each scaled video stream containing some or all of the video data from the video input stream, scaled by an amount that is different from the amounts by which the other scaled streams of the set are scaled, the prescaler also being programmed or arranged to feed said scaled streams to the packet switched network substantially simultaneously.

According to a third aspect of the invention, there is provided a video stream combiner for a multiviewer system in accordance with the first aspect of the invention, the combiner being programmed or arranged to receive from a packet switched network a plurality of scaled video streams fed to the network by prescaler means of the system, and to combine the selected scaled streams to produce a combined video stream which incorporates the video footage carried on the selected scaled streams, for display on a display device.

According to a fourth aspect of the invention, there is provided a multiviewer system comprising a prescaler and a combiner as aforesaid, and a packet switched network linking the prescaler and combiner.

The invention also lies in a method simultaneously presenting at a viewing location, video streams for multiple sources, the method comprising the steps of:
(a) generating from each input of video stream a respective set of one or more scaled video streams of differing proportions relative to the input stream;
(b) ensuring that the format of the scaled streams is in accordance with the requirements of a packet switched network to allow said streams to be transmitted across such a network;
(c) feeding the scaled video streams to a packet switched network;
(d) receiving selected scaled video streams from the network;
(e) combining the selected streams to create a combined video stream which incorporates the videos carried on the selected scaled streams; and
(f) supplying said combined video stream to a display device for display thereon.

BRIEF DESCRIPTION OF THE DRAWINGS

The invention will now be described, by way of example only, with reference to the accompanying drawings, in which.

DETAILED DESCRIPTION

Figure 1:
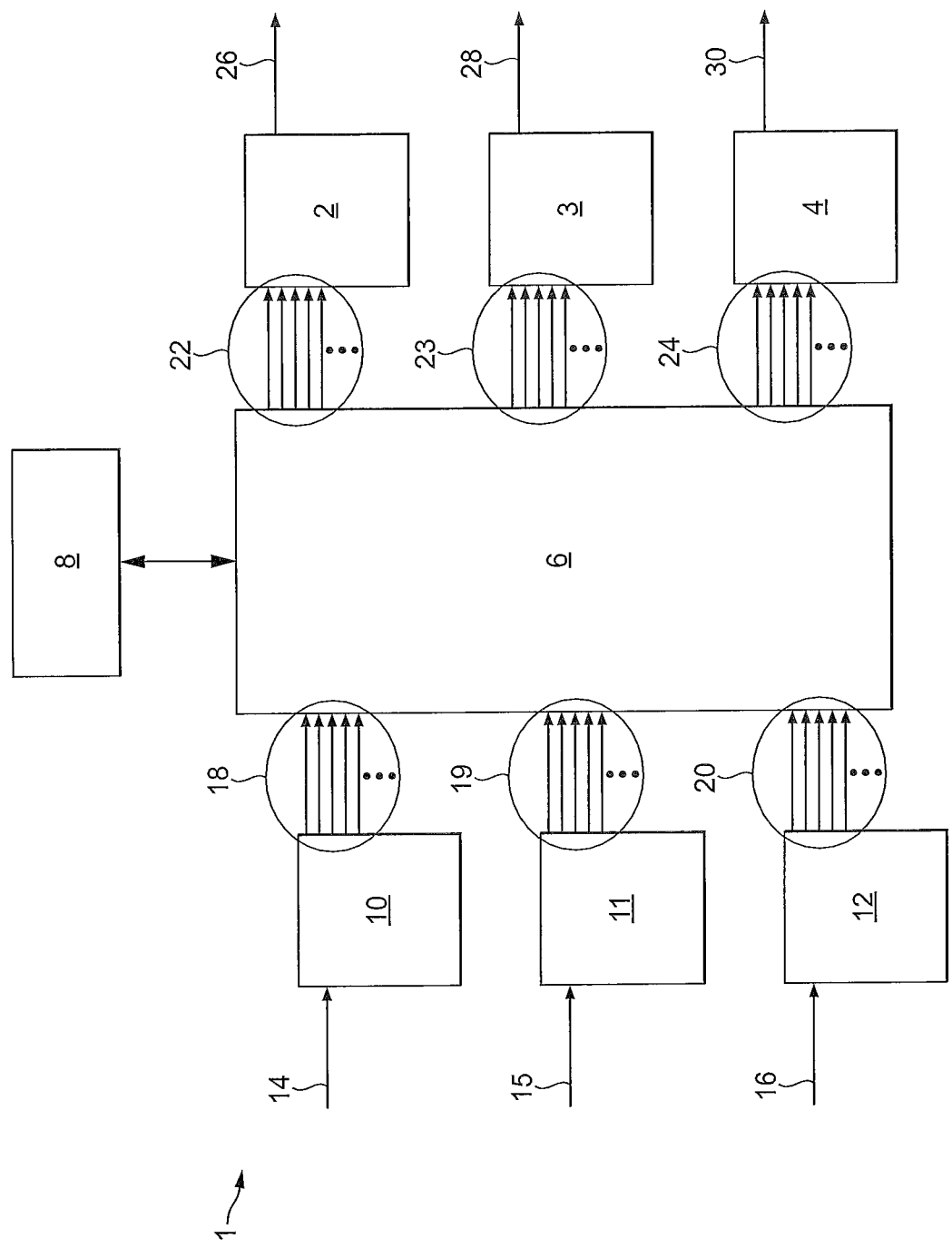
FIG. 1 is a block diagram of an embodiment of a video multiviewer system in accordance with the invention, the system being shown when connected to a packet switched network.

With reference to FIG. 1, a multiviewer system in accordance with the invention comprises video prescaler means 1 connected to three video stream combiners 2-4 via a packet switched Internet Protocol (IP) network 6, which in this example is a facility local area, packet switched, IP network. The operation of the prescaler means 1 and combiners 2-4 is controlled by means of a control module 8 which communicates with the prescaler means 1 and video stream combiners 2-4 via the network 6.

The video prescaler means 1 comprises three video stream prescalers 10-12. Each of the video stream prescalers 10-12 receives a respective one of three input video streams 14-16. Each of the input video streams is derived from a respective source, such as a camera or video storage device, that is converted by the respective prescaler into a respective one of three sets 18-20 of scaled video streams. Each member of each of the sets is at a respective different scale compared to the input stream from which it is derived. Thus the members of each set are of differing scales from each other. Each scale may be a reduced scale or an enlarged scale relative to the input stream. In the described example of the operation of the prescaler, however, each member of each of the sets is at a respective reduced scale compared to the input stream from which it is derived. The scales for each set follow one or more (in the described example, either of two) geometric series as discussed below in relation to the operation of the system.

Each of the video stream prescalers 10-12 is connected to a respective router (not shown) of the network 6. The control module 8 includes a man machine interface (not shown) which enables a user to select any combination of scaled streams in the sets 18-20 for supply to any selected one or more of the combiners 2-4. The selected streams propagate across the network 6 to the combiners 2-4 which are operable to display those streams, and each of the reference numerals 22-24 denotes a respective set of input scaled video streams for each of the combiners, the members of each of the sets 22-24 being selected from the members of the sets 18-20.

Each combiner 2-4 is operable to generate a combined output video stream which is a composite of the scaled streams of the combiner's set of input video streams. In FIG. 1, reference numeral 26 therefore denotes the composite of the video streams of the set 22, whilst reference numerals 28 and 30 respectively represent the composites of the sets 23 and 24. Each of the combined streams 26-30 can be supplied to a respective display screen and is such that the video carried on each stream within the input set for the combiner is displayed in a respective one of a number of windows that tile the display. The prescalers 10-12 are identical to each other, and only prescaler 10 will therefore be described, with reference to FIG. 2.

Although the prescaler is shown in FIG. 1 with only one input video stream being fed to it, the prescaler does in fact have two input modules 32 and 34 to input video streams in different formats. The module 32 is a commercially available 10 Gb Ethernet interface module (for example 10 Gb Ethernet transceiver modules: http://www.cisco.com/c/en/us/products/collateral/interfaces-modules/transceiver-modules/data_sheet_c78-455693.html). This is a small form-factor pluggable transceiver based on the SFP standard (see for example SFP modules: https://en.wikipedia.org/wiki/Small_form-factor_pluggable_transceiver), and is operable to receive packetized data formatted either to SMPTE2022 or to RFC4175.

The input module 34 is also a commercially available SDI interface module also based on the SFP standard. This module is operable to receive a video input 14 in the form of an SDI data stream according to SMPTE259, SMPTE292 or SMPTE424, for example, http://www.enbrionix.com/products/ProductDetails.aspx?id=9edc1e25-7d6d-4d8c-9813-2ee885a208f2. Module 32 is operable to provide a physical interface to the Ethernet network and module 34 is operable to provide a physical interface to an SDI video signal. Both modules 32 and 34 perform basic decoding of the respective video input to provide data that are then transferred to an I-O field programmable gate array (FPGA) 36 which provides the remaining interface support and decoding. The FPGA 36 may be a suitable member of the Xilinx Kintex 7 silicon devices (see for example Kintex 7: http://www.xilinx.com/products/silicon-devices/fpga/kintex-7.html).

Each module 32 and 34 is connected to a respective port of the FPGA 36.

The FPGA places the input data from either or both streams from modules 32 and 34 into an internal format, which is independent of the format of the input stream 14 (Ethernet or SDI), and which includes an identifier for the input stream (or a respective identifier for each input stream, where both streams are being processed).

These data and identifier(s) are passed across a high bandwidth inter-FPGA bi-directional data bus 38 connected to a direct memory access (DMA) FPGA 40.

This reformats the video data, separating each stream into a sequence of packets, each containing a block of data, the stream identifier, and a stream-specific packet sequence number for transfer to a computer graphics-based processor module 42 (which for example may be as shown at http://www.avionic-design.de/uploads/embedded/tegra_k1_processor_module_EN.pdf). The module 42 is connected to the FPGA 40 by a 4-lane Gen 2 PCIe interface 44 (for example an interface of the type identified in PCIe: https://en.wikipedia.org/wiki/PCI_Express) with the processor module 42 acting as the root complex and the DMA FPGA 40 acting as an endpoint. The transfer of packetized data across the link 44 is managed by standard PCIe protocols and methods.

The computer graphics-based processor module is programmed to perform the necessary video processing in its internal memory space to produce a plurality of scaled packetized video streams as discussed below. The scaled video streams are produced in a format suitable for transfer to the DMA FPGA 40 across the interface 44, which is inherently bi-directional.

The DMA FPGA 40 reformats the scaled streams, extracting the scaled video data from the PCIe packets on the basis of the stream identifier and sequence numbering, and creating a set of contiguous video data streams, which are transferred to the I-O FPGA 36 across the high-bandwidth inter-FPGA bi-directional bus 38. It will be appreciated that the scaling procedure performed by the module 42 generates streams which are of a reduced resolution compared to the input video streams.

Figure 2:
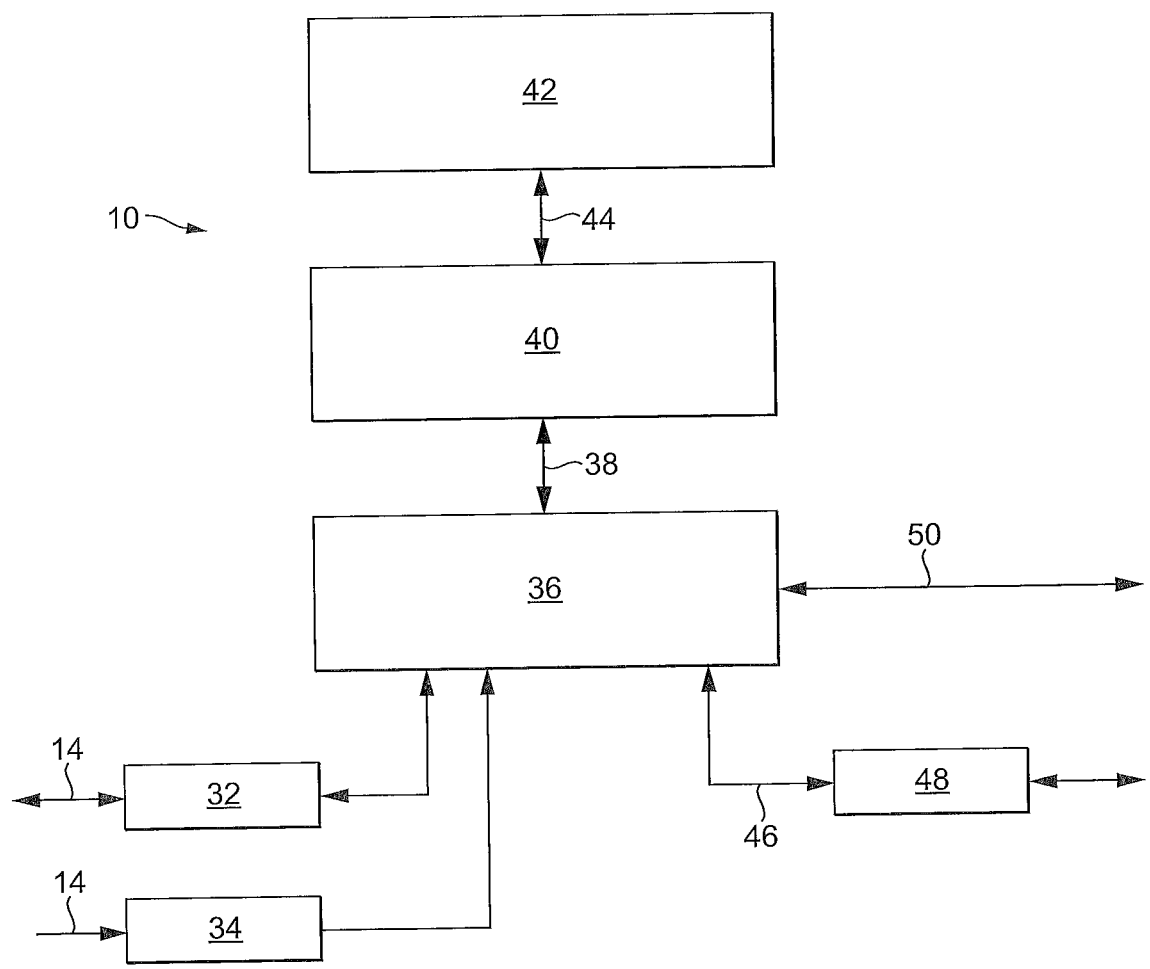
FIG. 2 is a block diagram of a first embodiment of prescaler, also in accordance with the invention, of the multiviewer system shown in FIG. 1.

The I/O FPGA 36 processes the scaled streams so that they are reformatted for transmission across a local link 46 to a commercially available 10 Gb Ethernet SFP interface module 48. The prescaler shown in FIG. 2 is intended to operate in the present applicant's "Vision" frame which includes conditioned voltage supplies and cooling equipment for the prescaler http://www.crystalvision.tv/support/brochures/20152016visionproductrangecatalogue.pdf. The 'Vision' frame also provides a control interface and uses this facility to enable the prescaler 10 to communicate with the control module 8 via a control link 50 and the network 6 which is connected to a control port of the prescaler 10 via the link 50.

Figure 3:
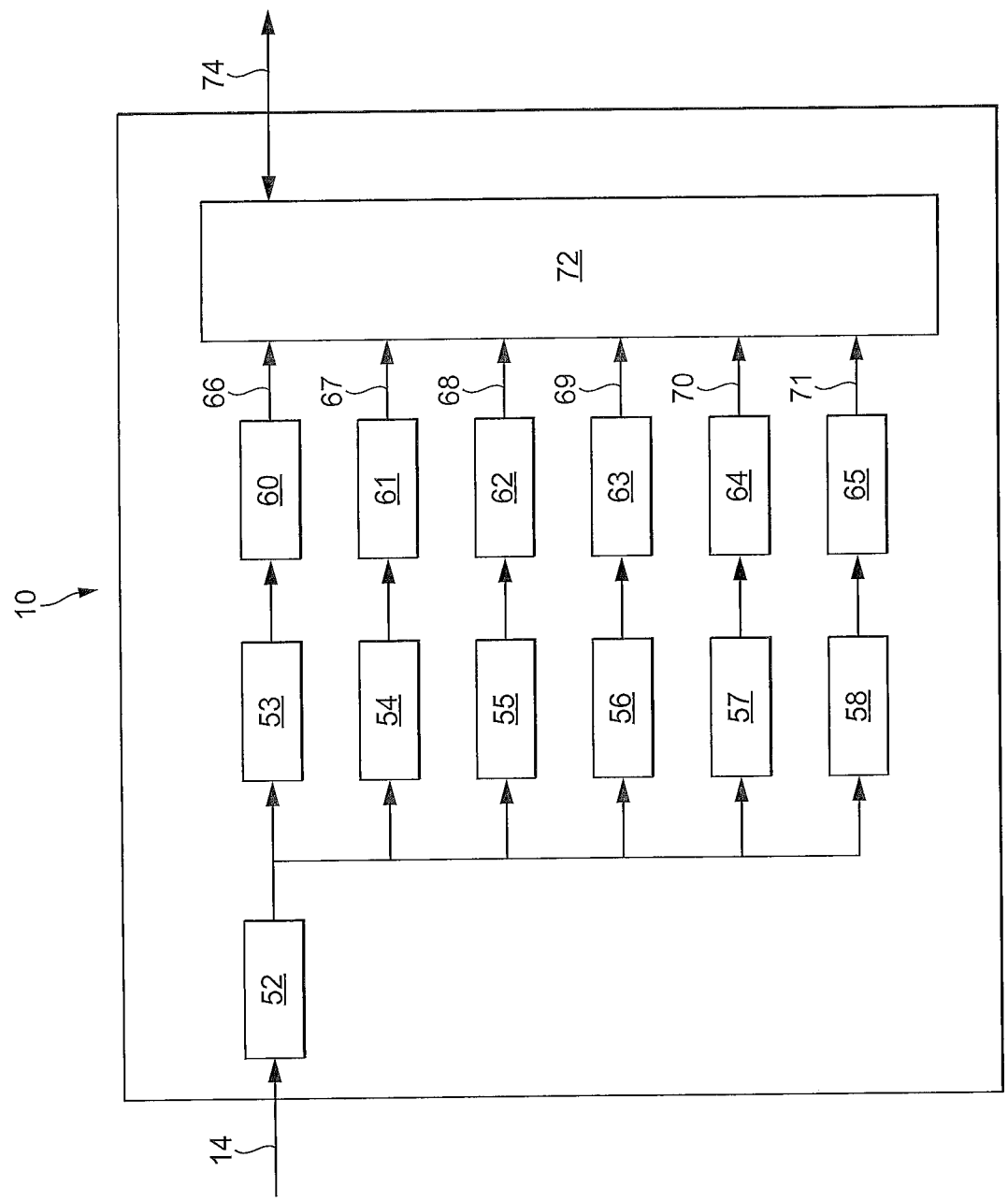
FIG. 3 is a functional block diagram illustrating the operation of the prescaler shown in FIG. 2.

The operation of the prescaler 10 will now be described with reference to FIG. 3 the various blocks of which represent functions implemented within the hardware shown in FIG. 2.

The input video stream 14 supplied to the prescaler 10 may be in any one of a number of possible formats. More specifically, the stream might be an SDI video stream, as defined by SMPTE259, SMPTE292, or SMPTE424, further information on all of which are provided at https://en.wikipedia.org/wiki/Serial_digital_interface, or an equivalent SDI stream carried as packetized data according to SMPTE2022-6 (http://www.tvtechnology.com/insight/0083/smpte-and-the-future-of-video-over-ip/220188), or an uncompressed video-only packetized stream according to IETF RFC4175 (http://www.rfc-base.org/rfc-4175.html). In addition or as an alternative to either or both of the input modules 32 and 34, the prescaler may have an input module that could accept another equivalent format for video input data.

The stream 14 is then subjected to decoding and conversion to an internal format, and these steps are denoted by the functional block 52, and are implemented in either the module 32 or 34 (depending upon the format of the input stream 14) and the I/O FPGA 36. Block 52 also represents the subsequent reformatting of the video data in the DMA FPGA 40 for transfer to the computer graphics-based processor module 42. Any non-video data (such as audio or other ancillary data) in the input stream may be discarded for the purposes of the multiviewer. In an alternative embodiment of prescaler, the functional block could be implemented as a single logic programmed FPGA (as shown in for example: https://en.wikipedia.org/wiki/Field-programmable_gate_array, http://www.xilinx.com/products/intellectual-property/smpte_sdi.html and www.xiliix.com/products/intellectual-property/ef-di-smpte2022-56.html) or by other means. The video data generated by the conversion steps 52 are in a format suitable for processing by the module 42 which is programmed to function as six video scalers 53-58, each of which performs a resolution reduction on each of the frames of the video stream. The scalers reduce the video stream resolution by different amounts from each other, but the reduction performed by each scaler of the described example will be the same in both spatial dimensions and does not vary with time.

Thus all of the frames of each scaled video stream produced by the scalers 53-58 are scaled by the same respective amount. In addition the frame rate for such scaled stream will be constant, the scaled streams all preferably having the same frame rate as each other. Examples of possible frame rates for the streams are: 24/1.001 (23.976) Frames per second (FPS); 24 FPS; 25 FPS; 30/1.001 (29.970) FPS; 30 FPS; 48/1.001 (47.952) FPS; 48 FPS; 50 FPS; 60/1.001 (59.940) FPS; 60 FPS; 100 FPS; 119.88 FPS or 120 FPS.

Typically, the output video stream image sizes from the different scalers will form a mathematical progression. For example, the resolution of the largest reduced resolution stream might be half that of the input stream, the next a quarter, the next one-eighth, the next one-sixteenth and so on, so that the dimensions form a convergent geometric series having a common ratio of ½. Thus in terms of linear dimensions, the first stream will have height and width resolutions each of which is 0.707× the original video stream resolution, the next would be 0.5×, then 0.353×, 0.25× and so on.

Each reduced resolution video stream is fed from the respective scaler 53-58 to a data packetizer 60-65 which is also implemented within the computer graphics-based processor module 42. Working to RFC4175 or another packet-based video transport protocol or method, the module 42, functioning as the packetizers 60-65, generates packetized, scaled data streams 66-71 which are then processed by the steps represented by the functional block 72. Those steps comprise the formatting, handshaking and similar functions needed to transmit the packetized streams onto the packet-based data network 6 through the packet link 74. Some of the functions represented by the block 72 are performed by the computer graphics-based processor module 42. The resultant packetized data can be sent across a PCIe link to an FPGA to provide a low level network interface. The packetized, scaled data streams 66-71 are transferred to the DMA FPGA 40 across the PCIe link and then across the high bandwidth inter-FPGA bi-directional data bus 38 to the I-O FPGA 36. The I-O FPGA uses its internal logic, based around Xilinx intellectual property (http://www.xilinx.com/products/intellectual-property/do-di-10gemac.html or similar) or equivalent means, to format the data suitably for transmission across a local link 46 to a commercially available 10 Gb Ethernet SFP interface module 48.

Figure 4:
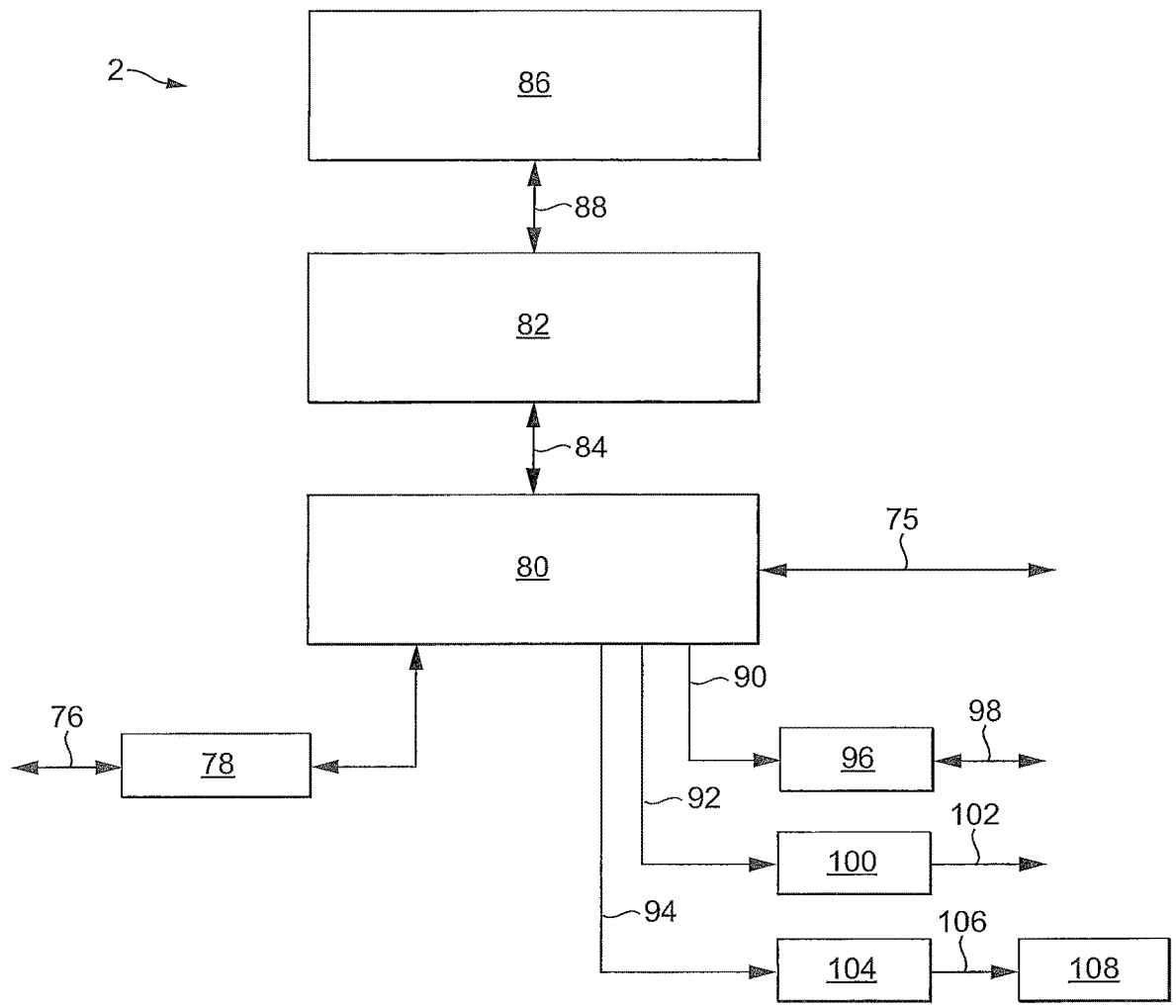
FIG. 4 is a block diagram of a first embodiment of video stream combiner, also in accordance with the invention, of the multiviewer system.

Turning to FIG. 4, the video stream combiners 2-4 are identical to each other, and only the combiner 2 will therefore be described. This is a single output video stream combiner connected to the packet switched network 6 by link 76.

In use, the required prescaled video streams, which are formatted to RFC4175, are supplied to the combiner via the link 76. The combiner includes a commercially available 10 Gb Ethernet SFP interface module 78 via which the combiner 2 is connected to the link 76. The interface module performs basic decoding of the scaled video stream data which are then transferred to an I/O FPGA 80 which may be a suitable member of the Xilinx Kintex 7 family of devices (see Kintex 7: http://www.xilinx.com/products/silicon-devices/fpga/kintex-7.html). The FPGA 80 performs the remaining interface support and decoding using standard approaches, for example based around Xilinx media access controller (http://www.xilinx.com/products/intellectual-property/do-di-10gemac.html) or similar.

The operation of the combiner 2 is controlled by the module 8 connected via network 6 and a link 75 to a control port on the FPGA 80.

A DMA FPGA 82 is connected to the I/O FPGA 80 via a high bandwidth inter-FPGA bi-directional data bus 84. The separate streams of prescaled video data are output from the FGPA 80 in an internal format and supplied to the FPGA 82 via the bus 84. The DMA FPGA reformats the data streams for transfer to a computer graphics-based processor module 86 across a 4-lane Gen 2 PCIe interface 88. An example of the type of hardware that can be used as the module 86 is shown at: http://www.avionic-design.de/uploads/embedded/ tegra_k1_processor_module_EN.pdf. The DMA FPGA 82 may be a suitable member of the Xilinx Kintex 7 family.

Software in the module 86 causes the module to perform the required video processing optionally to further scale the prescaled video streams and then combine the streams to produce the desired full resolution output combined video stream.

The full output resolution combined video data stream produced by the module 86 is in a format suitable for transfer to the DMA FPGA 82 across the bi-directional PCIe interface 88. The DMA FPGA 82 reformats the combined video data stream before passing the formatted data stream to the I/O FPGA 80 across the high bandwidth inter FPGA bi-directional data bus 84. The I/O FPGA 80 formats the combined full output resolution data stream, supplied over the bus 84, into an SDI data stream according to SMPTE259, SMPTE292 or SMPTE424, and this data stream is supplied to a data link 90 and to a second data link 92 for the combined data stream.

In addition, the I/O FPGA 80 is programmed to feed a duplicate of the data stream fed to the second link 92 to a third data link 94.

The first data link 90 is connected to a commercially available SDI to SMPTE 2022-6 and 10 Gb Ethernet SFP module 96 (for example: http://www.embrionix.com/prod-ucts/ProductDetails.aspx?id=7ec8afbf-0a4d-4a8f-bb41-148b3822a65a). The module 96 further packetizes the data to SMPTE2022-6, and transmits the data through a local data link 98 to a 10 Gb Ethernet data network to which a display may be connected. It will be appreciated that the display may be at a different location from the combiner, by virtue of its connection to the network, via a suitable interface module receiving the combined data stream from the network and reformatting the received stream so that it is suitable for display on the display device (which may, for example, be an LCD or OLED or a video projector).

The interface module may comprise an Artel System DLC450 HD-SDI video over IP Gateway http://www.artel-.com/products/details/dlc450 configured as a receiver.

The second link 92 is connected to a commercially available SDI interface module 100: (see for example: http://www.embrionix.com/products/ ProductDetails.aspx?id=aa353674-eb03-4a37-9370-50c4c4de16a) also based on the SFP standard. This produces a fully compliant SDI data stream that is supplied over a link 102 to an SDI-based studio system.

The third link 94 is connected to a SDI to HDMI transmitter SFP device 104 for example http://www.embrionix-.com/products/ProductDetails.aspx?id=ba62d8cf-48bf-4dc4-8fe5-dbfed538226e. This produces an HDMI data stream which, in use, is supplied along a link 106 to a local display device, such as an OLED or LCD screen 108.

Figure 5:
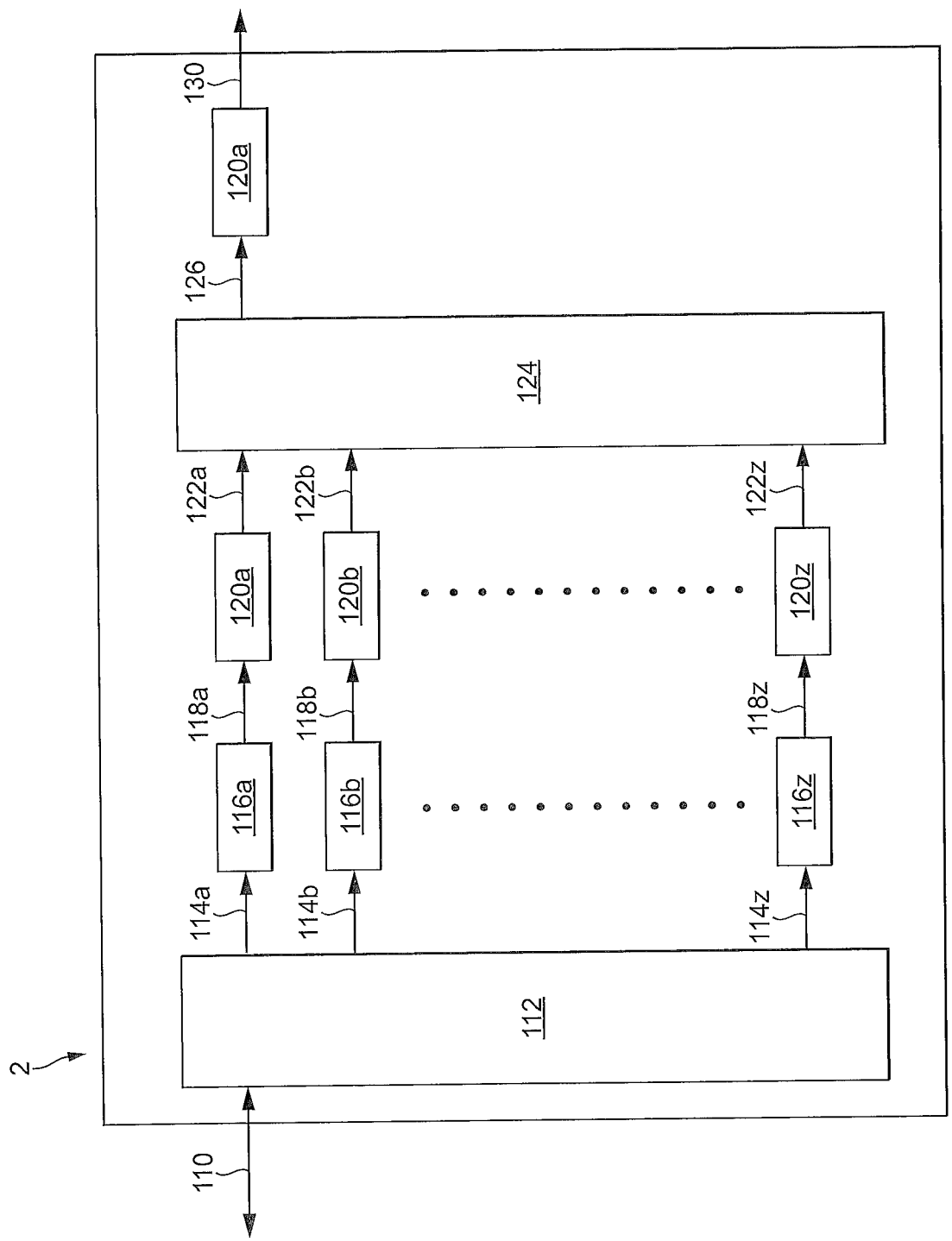
FIG. 5 is a functional block diagram of the video stream combiner.

The operation of the combiner 2 will now be described with reference to FIG. 5 in which reference numeral 110 denotes the interface between the combiner 2 and the network 6. This interface is implemented in the module 78 shown in FIG. 4, via which the video stream combiner receives selected packetized data containing the desired prescaled video streams for display. This is achieved by means of a multicasting protocol (as described for example in: https://en.wikipedia.org/wiki/IP_multicast), but the system can be alternatively configured so that the data is received by means of a software defined network: (https:// en.wikipedia.org/wiki/Software-defined_networking) or other equivalent means.

The functional block 112 represents the handshaking and decoding steps used to obtain, accept and separate out the relevant packetized video streams 114*a*-114*z*. The generating of the commands, by the combiner 2 for receiving the selected streams occurs in the computer graphics-based processor module 86, whilst the various related format changes are implemented in the components 78, 80 and 82.

Each of the selected streams is then separately processed by a respective video stream decoder of the group of decoders 116*a*-116*z* to produce video streams in an internal data presentation suitable for further processing. Those streams are denoted by reference numerals 118*a*-118*z*. In the hardware shown in FIG. 4 this decoding is performed in the module 78 and the I/O FPGA 80.

The video streams 118*a*-118*z* are then processed separately by video stream scalers and address generators 120*a*-120*z* which produce a set of video data streams 122*a*-122*z* each containing the finally scaled video data, together with position and priority information. This processing may include further scaling if the combiner output tiling has been configured to use sub-image sizes different from those in the incoming scaled video streams as described in Use Example 2 and Use Example 3 below. This processing may also include dynamically variable scaling of the various sub-images, for example when the control system 8 changes the output tiling from one arrangement to another in a smooth progression rather than by an abrupt change, a method of operation commonplace in current multiviewers based on exclusively video technology.

The scalers 120*a*-120*z* are implemented in module 86 in this implementation.

Reference numeral 124 denotes a video memory and layering engine which uses the streams 122*a*-122*z* to construct a composite video stream 126 at the full output resolution. This stream is further processed by output formatter 128 to produce a video stream in the required format for sending to the display device.

It will be appreciated that the functions of the engine 124 are performed in the computer graphics-based processor module 86, whilst the formatter 128 is implemented in the processor module 86, the DMA FPGA 82, the I/O FPGA 80 and in the modules 96, 100 and 104. The formatter 128 produces an output video stream 130 for supply to a display device, either directly or via a 10 Gb Ethernet network. Depending on the output video frame rate and resolution this combiner implementation may be restricted to generating only one output format at any given time, so that only one of links 98, 102, and 106 would be active.

Figure 6:
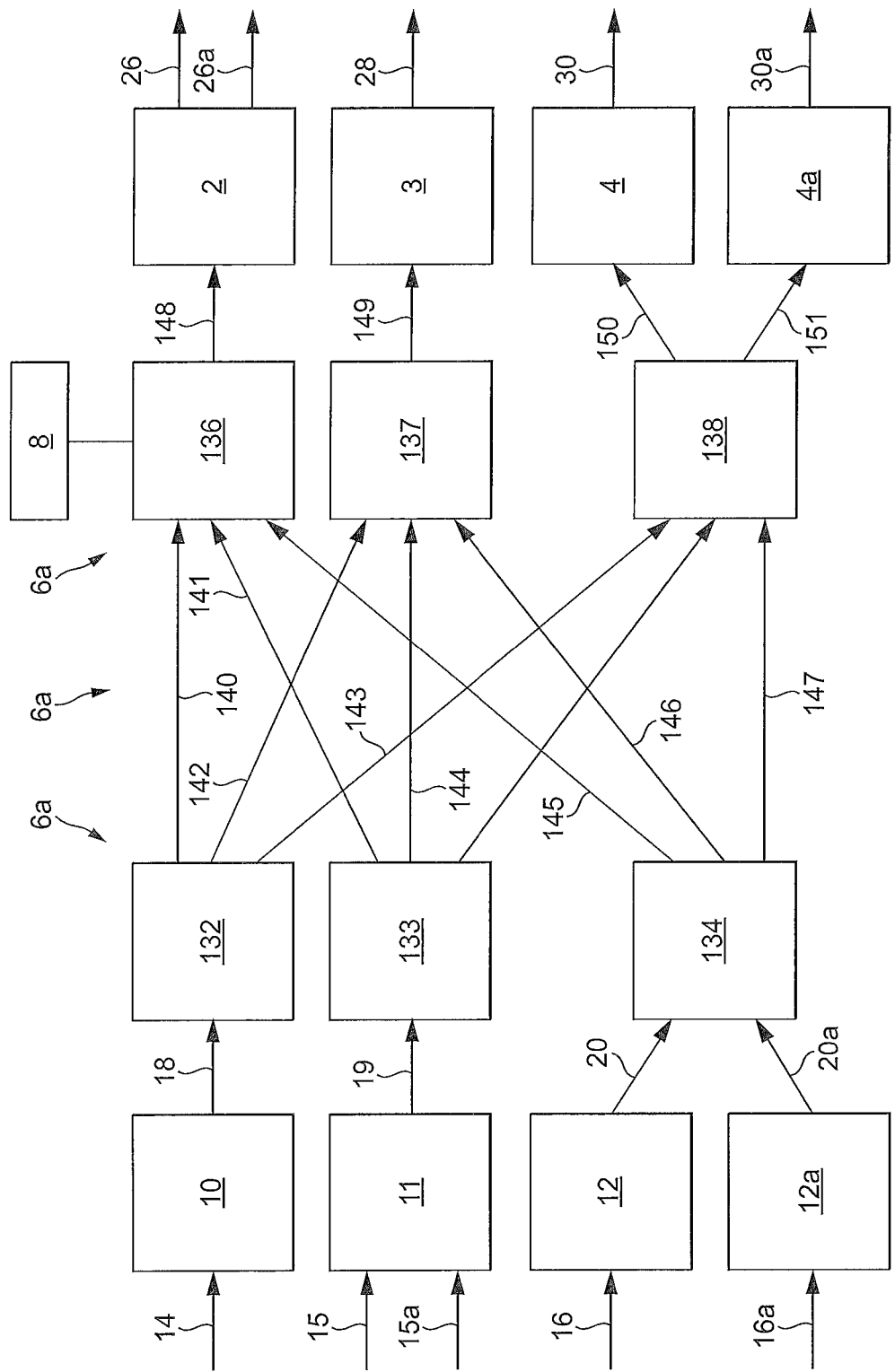
FIG. 6 is a block diagram of a modified version of the multiviewer system, showing examples (in simplified form) of the propagation of scaled video streams through the packet switched network.

FIG. 6 illustrates an example of data flow across a packet data network which connects a plurality of prescalers and combiners of a multiviewer system in accordance with the invention. The prescalers and combiners are substantially identical to those previously described and are therefore denoted by the reference numerals used in FIG. 1. However, the system shown in FIG. 6 has an additional prescaler, referenced 12*a*, and the prescaler 11 is configured to receive two input video streams 15 and 15*a*, 16*a* denoting the video stream being fed to the prescaler 12a. Furthermore, the system shown in FIG. 6 has an additional combiner, referenced 4a, whilst the combiner 2 is operable to produce two output video streams, 26 and 26a. The output stream from the combiner 4a is denoted by the reference numeral 30a. In this particular implementation, the prescalers and combiners are connected together over a 10 Gb Ethernet packetized network (for example as shown at 10 Gb Ethernet: https://en.wikipedia.org/wiki/10_Gigabit_Ethernet) 6a supporting operation using the Internet Protocol Suite (https://en.wikipedia.org/wiki/Internet_protocol_suite). It will be appreciated that the network 6a could alternatively comprise the internet.

The data are distributed as uncompressed video using RFC4175 (RFC 4175: http://www.rfc-base.org/rfc-4175.html) for transport and 'IP Multicasting' (IP Multicasting: https://en.wikipedia.org/wiki/IP_multicast) to avoid data duplication. All of these choices are illustrative and there are many other equivalent means of achieving the same results using standard data network methods and protocols. Alternative approaches, for example using RFC2250 (Carrying MPEG2 over RTP: https://tools.ietf.org/html/rfc2250) to convey MPEG2 transport streams (https://en.wikipedia.org/wiki/MPEG_transport_stream) containing compressed video (instead of RFC4175 for uncompressed video) and using Software Defined Networks (https://en.wikipedia.org/wiki/Software-defined_networking) to avoid traffic duplication (instead of IP Multicasting), can produce identical or very similar results in terms of network operation. These choices do not affect the underlying principles of operation.

The prescalers 10-12a are connected to routers 132-134 of the network 6a. Similarly, the combiners 2-4a are connected to the routers 136-138 of the network 6a over links 148-151. The router 136 is also connected to the control module 8 via which a user can control operation of the prescalers and combiners by means of commands, input through a man-machine interface on the module 8, transmitted over the network 6a. In FIG. 6, the 'prescaler' routers are shown as being directly connected to the 'combiner' routers by a set of direct links (140-147). This is for diagrammatic simplicity only. The principles of operation would be unaffected by any intermediate links and routers, as long as they support the relevant methods and protocols.

Each of the video stream prescalers (10-12a) receives one or more full resolution video streams (14-16a). Each video stream is processed by a video stream prescaler to produce the sets of scaled video streams 18-20a. These have calculable total data content ("bandwidth") relative to the full resolution input, depending on the quality and flexibility desired at the video stream combiner outputs. In this implementation, all of the scaled video streams are sent from each video stream prescaler to the adjacent (in network terms) network router. This means the data link 18 from a video stream prescaler 10 to its adjacent network router 132 carries data packets relating to each one of the plurality of scaled video streams of the set of scaled streams generated by the prescaler 10. Each data packet is associated with a single video stream and the data link 18 carries packets for all the streams of the set generated by the prescaler 10. Each of the scaled video streams is then sent to a separate IP Multicast Address, which is an IP address in a range reserved for IP Multicast operation. The IP Multicast addresses used by each video stream prescaler are configured during system set-up, or when the video stream prescaler is added to an existing system, or at another appropriate time. The network router 132 recognises the data packets as having an IP Multicast address and does not forward them unless requested as described below. The control module 8 uses configuration and control data to determine the IP Multicast addresses of the scaled video streams that each of the video stream combiners 2-4a needs to construct its desired composite output video stream. A specific video stream combiner 3 is told by the control module 8 that it needs one or more scaled video packet streams, each of which is being sent to a different IP Multicast Address.

For each of these streams, and therefore for each of these IP Multicast addresses, the video stream combiner 3 sends a request to join the relevant 'host group' to its adjacent router 137 by means of Internet Group Management Protocol (http://www.cisco.com/c/en/us/td/docs/ios/solutions_docs/ip_multicast/White_papers/mcst_ovr.html). The router 137 communicates this to each of the relevant 'prescaler adjacent' routers (and any intermediate routers) by one of several router-to-router protocols or methods intended for this purpose (CGMP, IGMP snooping, RGMP, see http://www.cisco.com/c/en/us/td/docs/ios/solutions_docs/ip_multicast/White_papers/mcst_ovr.html again). When the router 132 is alerted that another router 137 has a host (recipient) for some of its IP Multicast packets it starts forwarding them across the relevant network link 142. It will be appreciated that the inter-router links in the network 6a are established dynamically, in accordance with the location on the network of the recipient of the selected scaled video stream. The link 142 may then be set up in response to the request from the combiner 3.

This process of selective packet forwarding is a standard feature of suitable packet data networks and is not specific to multiviewer operation.

The same process operates in the case of a video stream prescaler 11 with more than one input video stream 15-15a. The packets sent across the link 19 to the adjacent router 133 will contain a plurality of scaled video streams for each of the inputs (i.e. two sets of scaled streams). The multiple video streams will be differentiated by their Multicast IP addresses, as in the previous example. The adjacent router 133 will have to deal with more packets but its operation is identical. This is also the case where two video stream prescalers 12-12a share an adjacent router 134 or where two video stream combiners 4, 4a share an adjacent router 138. Operation is the same as with the singular case described in more detail.

Video Stream Scaling: Quality and Bandwidth Trade-Offs

This section describes the maximum bandwidth required at a video stream prescaler output and the video stream combiner input for several typical use examples, of the embodiment of system in accordance with the invention.

With a typically efficient packet data network protocol it can be assumed that the network bandwidth required is roughly proportional to the data content, irrespective of the prescaled video stream image size.

The following calculations are based on a small sub-set of possible use examples and are intended to illustrate the principles of operation and not to provide a complete or exhaustive list.

Use Example 1

A system with fixed options for the sub-image area size ratios (i.e. the ratio between the area of an image from a scaled stream to that of a full scale image at the same resolution) in the combined video stream.

Figure 8:
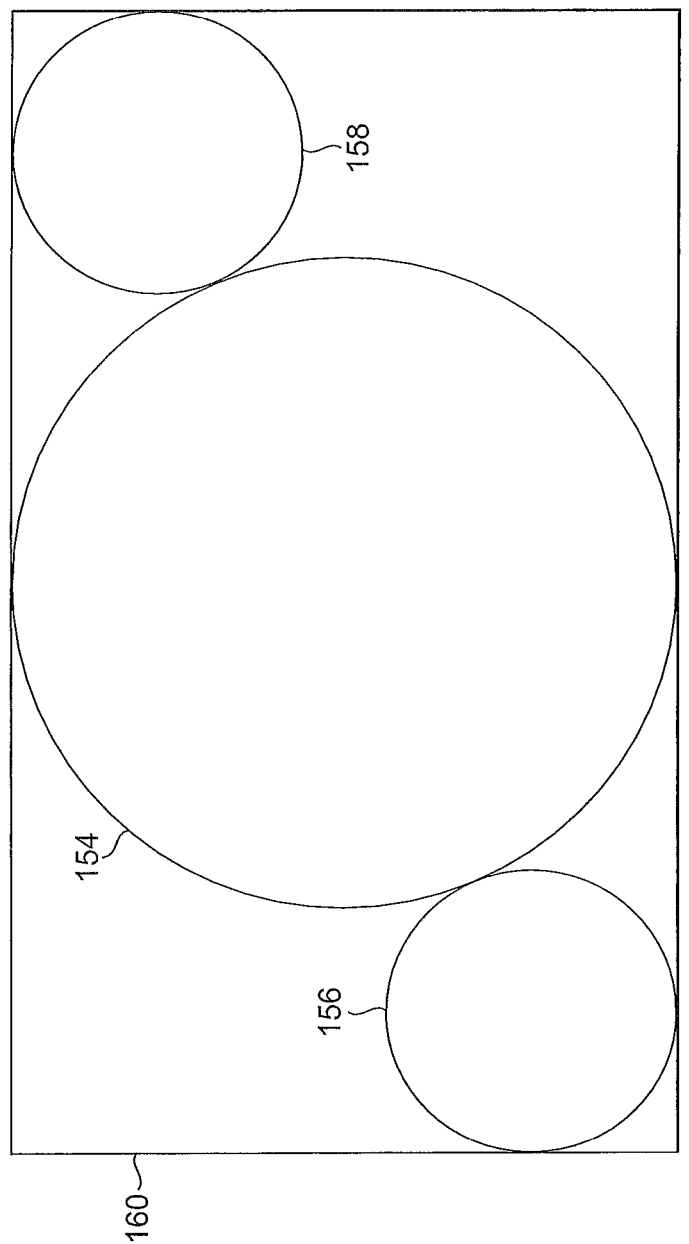
FIG. 8 is a diagrammatic representation of a display screen displaying video footage encoded on a full scale full resolution video data stream.
Figure 9:
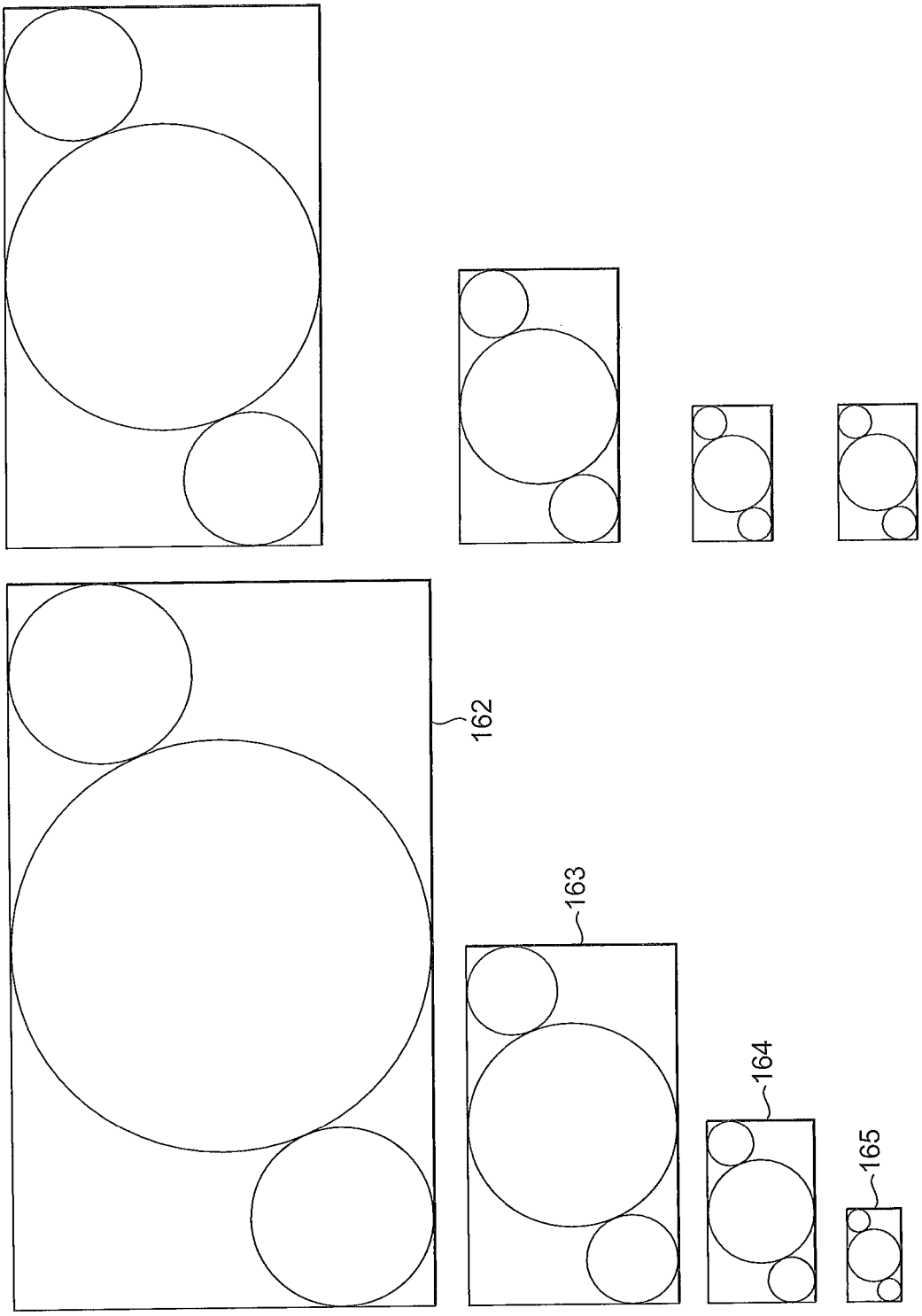
FIG. 9 shows corresponding representations at ⅔, ½, ⅓, ¼, ⅙, ⅛, ¹/₁₂ and ¹/₁₆ of the linear proportions of the full (i.e. full resolution) scale image.
Figure 11:
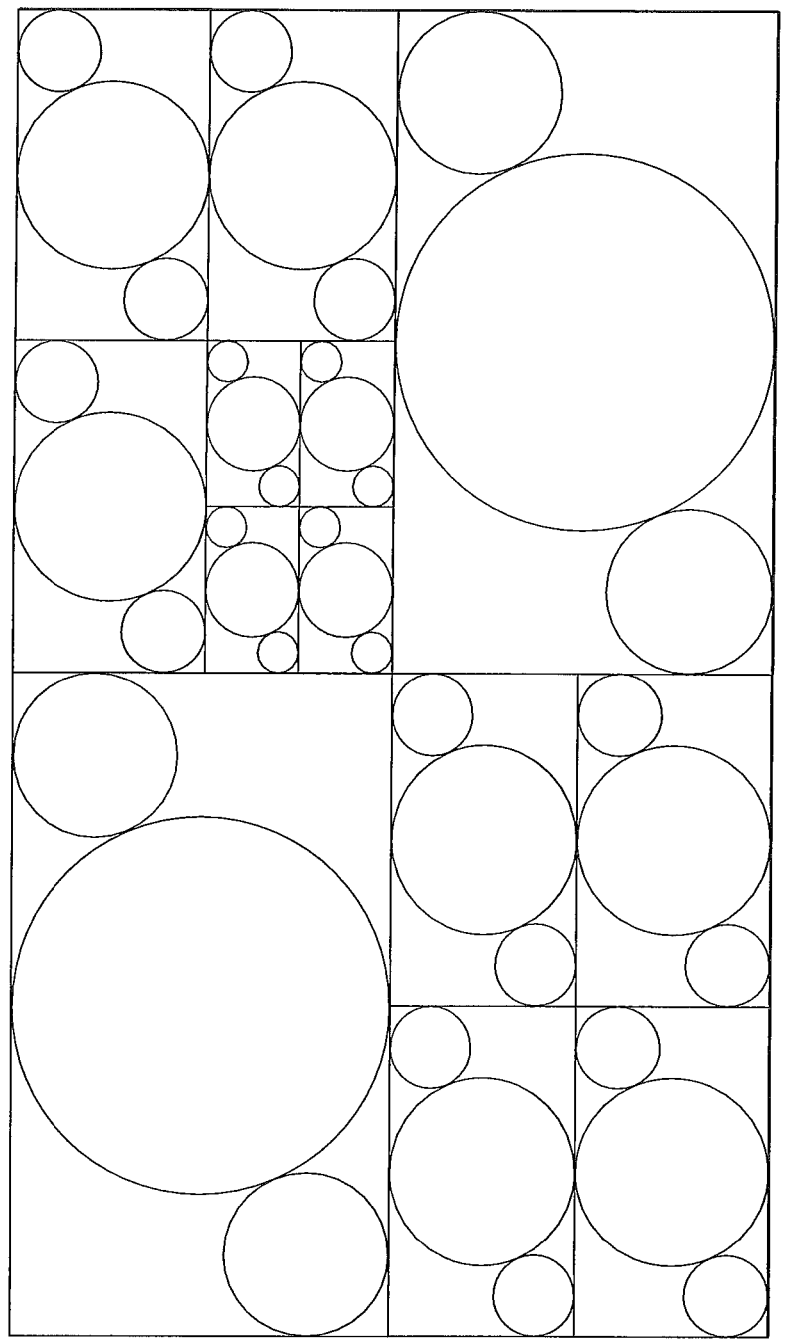
FIGS. 11 and 12 are similar views to FIG. 10, showing other examples of a display tiled with windows corresponding to some of the scaled streams shown in FIG. 9.

System Constraints and Characteristics
1. The construction of the combined output video stream is inflexible but simply defined.
2. The output video image area is considered as a set of fixed-size sub-areas, each of the same shape as the overall output image area.
3. These sub-areas have a binary relationship to the overall image area size: they are ½, ¼, ⅛, 1/16 . . . of the height and width. They therefore occupy ¼, 1/16, 1/64, 1/256 . . . of the image area.
4. Video streams used to make up the video stream combiner output have to fit within these sub-areas. Sub-image areas are not allowed to overlap.
5. By using a binary set of sizes we can allow relatively flexible tiling arrangements with a relatively small set of pre-defined video stream scaled resolutions.
6. Because of the tiling capability inherent in the prescaled video stream scaled resolutions there is no requirement for further scaling in the video stream combiners.
7. FIGS. 8, 9, and 11 are intended to illustrate this scaling and tiling in general terms.
8. Because there is no scaling in the video stream combiners, the quality of the scaled video streams is set entirely by the video stream prescaler operation. It is only affected by the quality of the calculations in the video stream prescalers; it does not interact with network bandwidth.

Data Content ("Bandwidth") Calculation
1. In effect the output video stream image area is divided into a grid of N×N sub-areas, where N is a power of 2 (2, 4, 8, 16 . . . ).
2. Prescaled video streams can occupy a set of these sub-areas of size M×M, where M is a power of 2 in the range one to N.
3. The user may, or may not, want to have a full-size representation of the input video stream available to the video stream combiners.
4. The video stream prescalers produce video streams with linear scaling of ½, ¼, ⅛ . . . 1/N and optionally with a scaling of 1 (the original video stream image size).
5. The data content of the scaled video streams is proportional to their area.
6. Therefore the data content of each of the scaled video streams (relative to an unscaled video stream) is 1, $½^2$, $¼^2$, $⅛^2$ . . . $1/N^2$.
7. This series (1, ¼, 1/16, 1/64, 1/256 . . . ) sums to 4/3 (1.33333).
8. Therefore, data content of the video stream prescaler output is a maximum of 1.333 times the full resolution video bandwidth (if the video stream prescaler has to output a full-resolution video stream) or 0.333 times that bandwidth (if the video stream prescaler does not have to output a full-resolution video stream).
9. Since the total video stream combiner output video stream consists of at most one full resolution output video stream worth of information content, the video stream combiner input should not need more than one full resolution output video stream worth of data bandwidth.

Use Example 2

A system with flexible output sub-image area sizes, where the video stream combiner can enlarge prescaled video streams to some extent. Such enlargement can be requested using the control module 8.

System Constraints and Characteristics
1. The sub-image areas are considered all to be the same shape (aspect ratio) as the full image area. A scaled video stream of a different aspect ratio will partially occupy an area of the correct aspect ratio.
2. The sub-image areas are not allowed to overlap.
3. The video stream combiner can scale the video streams meaning that the combined video stream can have any arrangement of sub-image areas that fulfils the first two requirements.
4. The requirements for bandwidth and displayed video stream quality are such that it is acceptable for the video stream combiner to enlarge video streams to some extent. This potentially reduces video stream quality since the information lost during video stream resolution reduction in the prescaler cannot be recovered.

Data Content ("Bandwidth") Calculation
1. We can assume that it is acceptable for the video stream combiner to enlarge the video streams by a factor of the square root of 2 ($\sqrt{2}$=1.4142). This is a reasonable degree of enlargement for a multiviewer application if video stream quality is not a prime consideration. It produces an acceptable trade-off between quality and bandwidth, and it is convenient for the purposes of calculation.
2. Then the video stream prescaler can produce a set of video streams with a linear scaling of $1/\sqrt{2}$, ½, $½\sqrt{2}$, ¼, $¼\sqrt{2}$ . . . (0.707, 0.5, 0.353, 0.25, 0.177 . . . ).
3. From these the video stream combiner can produce a video stream of any size by starting with the next size down and enlarging it by no more than a linear scaling of $\sqrt{2}$ (approximately 1.4).
4. This set of scaled video streams also contains all of the binary scaled video streams described in Case 1, except for the optional full size stream. This would allow for a system containing video stream combiners with differing capability levels.
5. The data content of each prescaled video stream will be proportional to its area.
6. Therefore, relative to a full screen video stream, the data content of each of the set of streams will be ½, ¼, ⅛, 1/16, 1/32 . . . (0.5, 0.25, 0.125, 0.0625, 0.03125 . . . )
7. This series sums to 1. Therefore, each video stream prescaler will have to produce the same amount of data as in a full resolution input video stream.
8. A video stream combiner can enlarge and there is no need for it to shrink a video stream, assuming that the video stream prescalers produce video streams smaller that those allowed (for practical, control, or other reasons) in the combined output.
9. Therefore the largest amount of data a video stream combiner should need is equal to a full output resolution video stream.

Use Example 3

A system with flexible output sub-image area sizes, where the more demanding video quality requirements mean that a video stream combiner can only reduce the size of prescaled video streams.

System Constraints and Characteristics
1. The sub-image areas are considered all to be the same shape (aspect ratio) as the full image area. A video stream of a different aspect ratio will partially occupy an area of the correct aspect ratio.

2. The sub-image areas are not allowed to overlap.
3. The video stream combiner can scale the video streams meaning that the combined video stream can have any arrangement of sub-image areas that fulfils the first two requirements.
4. The video quality requirements are such that it is not acceptable for the video stream combiner to enlarge video streams; it can only reduce video streams.
5. However, the video stream combiner has to deal with many input video streams but the total output is constrained to occupy a single full-resolution video stream.
6. Therefore we can still reduce the network loading and the computational load on the video stream combiner by providing sets of prescaled video streams.

Data Content ("Bandwidth") Calculation
1. The video stream prescaler can produce a set of video streams with a linear scaling of 1, $1/\sqrt{2}$, $1/2$, $1/2\sqrt{2}$, $1/4$, $1/4\sqrt{2}$ ... (1, 0.707, 0.5, 0.353, 0.25, 0.177 ...). In this case the video stream combiner needs access to an unscaled (linear scaling of 1) video stream to produce video streams scaled slightly below full size.
2. This is the same set of scaled video streams as considered in Use Example 2, with the addition of the unscaled stream. This would allow for a system containing video stream combiners with capability levels corresponding to Use Examples 1, 2, and 3.
3. The data content will be proportional to area for each scaled video stream.
4. Therefore the data content of the set of streams will be 1, $1/2$, $1/4$, $1/8$, $1/16$, $1/32$ ... (1, 0.5, 0.25, 0.125, 0.0625, 0.03125 ...)
5. This series sums to 2. Therefore, each video stream prescaler will need an output bandwidth twice that of a full resolution video stream.
6. In the edge case, the video stream combiner will have to fill the output with video streams that have all been reduced by an area factor of just less than two by processing within the video stream combiner.
7. Therefore the video stream combiner should need a maximum input bandwidth twice that of a full resolution output video stream.

Use Example 4

As Use Example 1 but based on a $2/3$, $1/3$, $1/6$ ... series rather than $1/2$, $1/4$, $1/8$ ....

Figure 10:
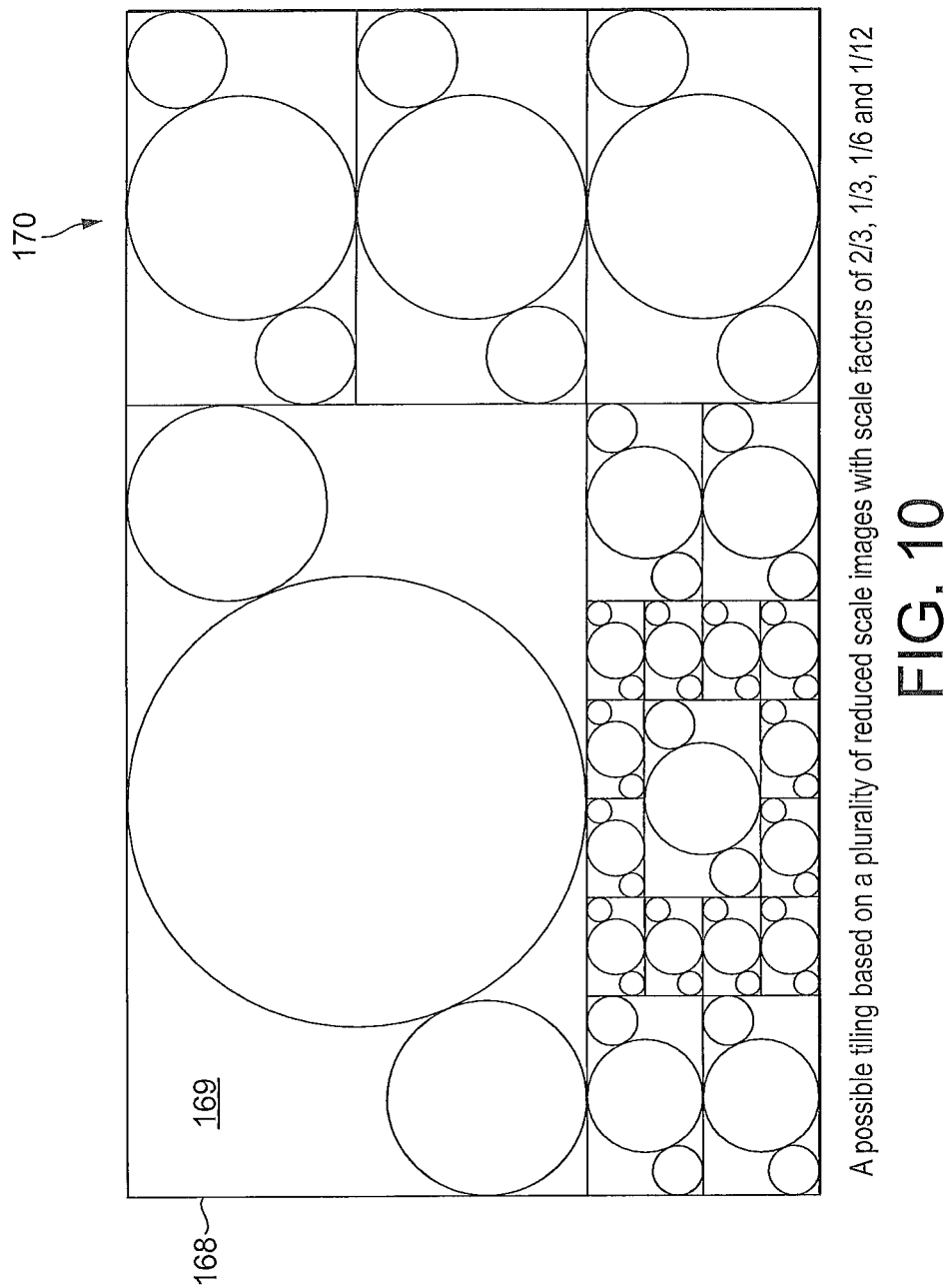
FIG. 10 shows an example of a display screen fed with a combined video stream from the combiner of a multiviewer system in accordance with the invention, the screen being tiled with windows corresponding to some of the scaled streams shown in FIG. 9.

System Constraints and Characteristics
1. The construction of the combined output video stream is inflexible but simply defined
2. The output video image area is considered as set of fixed-size sub-areas, each of the same shape as the overall output image area.
3. These sub-areas have a binary relationship to each other and a simple fractional relationship to the overall image area size: they are $2/3$, $1/3$, $1/6$, $1/12$ ... of the height and width. They therefore occupy $4/9$, $1/9$, $1/36$, $1/144$ ... of the image area.
4. Video streams used to make up the video stream combiner output have to fit within these sub-areas. Sub-image areas are not allowed to overlap.
5. By using a binary set of sizes we can allow relatively flexible tiling arrangements with a relatively small set of pre-defined video stream scaled resolutions.
6. FIGS. 8, 9, and 10 are intended to illustrate this scaling and tiling in general terms.

7. Because of the tiling capability inherent in the prescaled video stream scaled resolutions there is no requirement for further scaling in the video stream combiners.
8. Because there is no scaling in the video stream combiners, the quality of the scaled video streams is set entirely by the video stream prescaler operation. It is only affected by the quality of the calculations in the video stream prescalers; it does not interact with network bandwidth.

Data Content ("Bandwidth") Calculation
1. The user may, or may not, want to have a full-size representation of the input video stream available to the video stream combiners.
2. The video stream prescalers produce video streams with linear scaling of $2/3$, $1/3$, $1/6$ ... 1/N and optionally with a scaling of 1 (the original video stream image size).
3. The data content of the scaled video streams is proportional to their area.
4. Therefore the data content of each of the scaled video streams (relative to an unscaled video stream) is 1, $2^2/3^2$, $1/3^2$, $1/6^2$ ... $1/N^2$.
5. The series ($4/9$, $1/9$, $1/36$, $1/81$ ...) sums to $16/27$ (0.5925)
6. Therefore, data content of the video stream prescaler output is a maximum of 1.5925 times the full resolution video bandwidth (if the video stream prescaler has to output a full-resolution video stream) or 0.5925 times that bandwidth (if the video stream prescaler does not have to output a full-resolution video stream).
7. Since the total video stream combiner output video stream consists of at most one full resolution output video stream worth of information content, the video stream combiner input should not need more than one full resolution output video stream worth of data bandwidth.

Use Example 5

A system similar to Use Example 2, where the video stream combiner can enlarge prescaled video streams to some extent. A slightly different set of prescaled image sizes is chosen, giving greater computational efficiency in the prescaler at the cost of slightly uneven size steps in the plurality of scaled images, with a consequent potential loss of image quality.

System Constraints and Characteristics
These are the same as Use Example 2
1. The sub-image areas are considered all to be the same shape (aspect ratio) as the full image area. A video stream of a different aspect ratio will partially occupy an area of the correct aspect ratio.
2. The sub-image areas are not allowed to overlap.
3. The video stream combiner can scale the video streams meaning that the combined video stream can have any arrangement of sub-image areas that fulfils the first two requirements.
4. The requirements for bandwidth and display video stream quality are such that it is acceptable for the video stream combiner to enlarge video streams to some extent. This potentially reduces video stream quality since the information lost during video stream resolution reduction in the prescaler cannot be recovered.

Data Content ("Bandwidth") Calculation
1. The video stream prescaler can produce a set of video streams with an uneven linear scaling factor. This can be considered as two overlapping sets, each with a factor-of-two internal relationship. One of the sub-sets has linear scale factors of ⅔, ⅓, ⅙, 1/12 the other has linear scale factors of ½, ¼, ⅛, 1/16 . . . . Therefore the combined series is ⅔, ½, ⅓, ¼, ⅙ . . . .

2. Compared with use examples 2 and 3, the more straightforward fractional size relationships considerably reduce the computational effort needed to create the plurality of scaled images, allowing a cheaper prescaler, or the same prescaler to process a larger number of video streams.

3. This set of scaled images combines the set used in Use Example 1 with that used in Use Example 4. This would allow for a system containing video stream combiners with differing capability levels.

4. In Use Example 2, the relative linear scale factor (from one scaled image to the next one down in terms of size) is always 1/√2 (0.707 . . . ). In this combined series the relative linear scale factor alternates between ⅔ (0.666 . . . ) and ¾ (0.75). The presence of a slightly larger relative scale factor means that the video stream combiner might have to enlarge a video stream to a greater degree, resulting in a marginally greater loss of image quality.

5. As before, the data content scales with area. Therefore the data content of the set of streams will be 4/9, ¼, 1/9, 1/16 This series sums to 25/27 (0.9259259) . . . . Therefore each video stream prescaler will need an output bandwidth very slightly less than that required for a single full resolution stream.

6. From this set of prescaled video streams, the video stream combiner can produce a video stream of any size by starting with the next size down and enlarging it by no more than a linear scaling of 1.5.

7. A video stream combiner can enlarge and there is no need for it to shrink a video stream, assuming that the video stream prescalers produce video streams smaller than those allowed (for practical, control, or other reasons) in the combined output.

8. Therefore the largest amount of data a video stream combiner should need is equal to a full output resolution video stream.

There is a potential Use Example 6, analogous to Use Example 3 but with the different prescaler series. There are also further possible use examples where the combiner may either reduce or enlarge, for example in a case where the combiner generates a scaled image by reducing or enlarging whichever prescaled image stream is closest in size to that desired in the combined output.

In principle an infinite variety of prescaler series are available but the ½, ¼, ⅛ . . . and the ⅔, ½, ⅓ . . . series are the only ones we plan to use at present.

Comments about Constraints Applied to all Use Examples

Two constraints are used as simplifying assumptions in all the use examples given above. These are not intrinsic to this or any other multiviewer system. They are applied because they are 'sensible' and simplify the description and bandwidth calculations.

The Sub-Image Areas have the Same Aspect Ratio as the Output Image. The Sub-Image Areas do not Overlap.

These assumptions simplify the relationship between the output image size and the bandwidth required by the combiner. In effect they mean that the total amount of image data required by the combiner is related to the amount of data in the output image. If either of the constraints is not maintained then, in principle, the combiner can require a full image worth of input bandwidth for each sub-window.

Consider a multiviewer output containing multiple sub-images, each full width but a fraction of the full height. The prescaled image size needed is set by the width but the number of prescaled images needed is not constrained by the output image area, it depends on the how much vertical squeeze is applied.

Similarly, consider the case of an output image made up of many sub-images, each almost full size but overlapping so that only a small fraction of each may be visible. Since the majority of each image is hidden the combiner has to receive much more information than it is possible to fit in the output image.

In either of these cases the combiner input bandwidth requirement can be arbitrarily large. Neither of these issues makes our multiviewer design unworkable but I think they may significantly erode the advantages of our approach.

A general way of looking at it might be:

If you have to throw away a lot of information on an arbitrary basis as you do with heavily distorted aspect ratios or overlapping sub-images it makes sense to do that as soon as possible in the signal path. This would tend to favour (existing) approaches that closely couple the various processing elements. If you can make general assumptions about what information will be wanted at the output an isotropically scaled video stream of whatever size you can gain advantages by distributing the processing and using a more loosely coupled approach. In typical multiviewer applications as described in the background to the invention the sub-images are intended to represent the input video streams for the purpose of monitoring quality or content. In these applications the constraints under discussion are likely to apply or any deviations from them are likely to be minor.

Comments about Input and Output Resolutions

In principle the exact input and output resolutions are largely a local matter for the specific prescaler or combiner involved.

In practice our initial implementations of the multiviewer will probably use an internal 'full resolution' image size of 'Full HD' (1920×1080). It is likely that many of the inputs and outputs will also be this resolution.

It is possible that a fair proportion of the inputs may be 'SD' (720×480 or 720×524). It seems likely that the user may want these to be upscaled by the prescaler, at least to 'HD'(1280×720, a ⅔ linear scaling of 'Full HD') and possibly to 'Full HD' (1920×1080). In pixel terms this scaling is anisotropic because the pixel aspect ratio of SD does not match that of the higher resolutions used in television. This aspect ratio mismatch causes a problem in many areas of broadcast operation and it has been successfully addressed in various ways over the last ten years or more.

It is also probable that existing multiviewers are now, or soon will be, used with displays at '4K' resolution (3840×2160, also known as UHD-1), which are already widely available. The next generation '8K' resolution (7680×4320, also known as UHD-2) displays are being spoken of Multiviewers are a natural and obvious early application of these very high resolution displays; a multiviewer is a high value application that could bear the cost premium that results from being an early adopter in terms of display technology. Current multiviewers frequently use multiple full HD displays to increase the available display area, fewer larger displays would be preferable in the same way that a multiviewer is preferred to a wall of small displays.

The diagrammatic images shown in FIGS. 8-11 are diagrammatic representations of an image at different scales, and showing examples of how various different images of reduced scale can be used to tile the area of a display. FIG. 8 shows a full size, i.e. full resolution image typically of 1920×1080 pixels. This is a diagrammatic representation, comprising a pattern of a central circle 154 flanked by two diagonally opposed smaller circles 156 and 158. The rectangular boundary 160 represents the perimeter of the area of the displayed image.

FIG. 9 shows a plurality of reduced scale versions of the image arranged in descending size in four rows. The images are reduced by a linear scale to two-thirds, one half, one-third, one-quarter, one-sixth, one-eighth, one-twelfth and one-sixteenth. The linear scales of the reduced scale images thus form part of two interleaved geometric series each having a common ratio of ½. Each of the reduced scale images corresponds to a respective member of a set of scaled video streams produced by a prescaler of a multiviewer in accordance with the invention. FIG. 10 shows how the ⅔, ⅓, ⅙ and 1/12 images (respectively referenced 162-165 in FIG. 9) can tile a display area 168 in a common display. Each image, and hence the associated stream, constitutes a respective window in the area of the display 168, with the two-third scale image 169 being situated with its top left-hand corner corresponding with that of the display area 168. Three of the ⅓ scale images are arranged in a column 170 down the right-hand side of the display and the smaller scale images are set out beneath the image 169.

Figure 12:
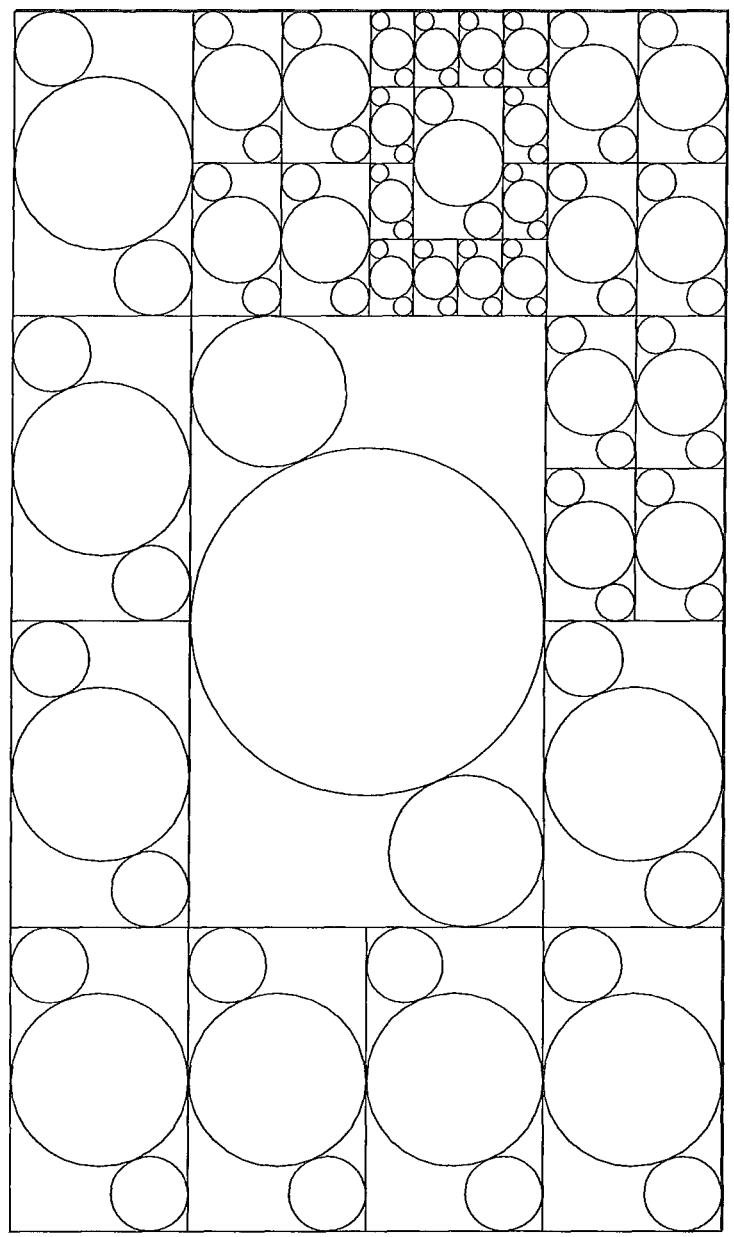

It will be appreciated that these different scale images are taken from different prescalers and therefore represent different video streams. It will also be appreciated that the arrangement shown in FIG. 10 is just one example of how a display area may be tiled with windows constituted by the scaled video streams, and FIGS. 11 and 12 show examples of how a similar display could be tiled with reduced scale streams with a common scale factor of 2 (i.e. which form a geometric series having a common ratio of ½).

Possible ways of controlling the multiviewer system, in terms of configuration and operation will now be discussed.
Version 1
Configuration:

What the user needs to determine when setting the multiviewer up, or adding additional video stream prescalers or video stream combiners to an existing installation.
Video Stream Prescalers:
 1. The identifiers for each of the video streams: in terms of the described implementation, the Multicast IP address.
 2. A list of the video streams available and their associated identifiers (Multicast IP addresses in the context of the described implementation).

In general, these would not change once the system is set up and is in operation. This would be in terms of operational convenience rather than because it is impossible in principle.
Video Stream Combiners:
 1. What operations they might perform (combine only, enlarge only, shrink only, add overlay information . . . ) This might even be a factory set "mode" or "device type" control.
 2. A list of the video streams available and their associated identifiers (Multicast IP addresses in the context of the described implementation)

Operation:
What the user will set and adjust when the system is in normal use.
Video Stream Prescalers:
Typically, no subsequent adjustment or setting alteration would occur.

Video Stream Combiners:
 1. Selection of which video streams (in terms of content) will feature in the combined output. In effect, which video stream prescaler input stream they are derived from.
 2. Size and position of the output image area for each of the video streams selected in item 1. This will be affected by the operational mode and so on (configuration item 1). This will allow the video stream combiner to select scaled video streams and receive them from the network based on the information used for prescaler configuration item 2.

More advanced implementations of the video stream combiner might have many more things to control:
 3. Additional down-scaling of video streams to allow for borders and so on.
 4. Additional graphics, either static (borders, video stream identification overlaid on the display etc. or based on additional information from non-video sources (graphics, clocks, audio bargraphs . . . ).

Version 2
Role of the control module 8:
 1. It keeps track of the video stream prescaler input streams and therefore the relationship between the IP Multicast addresses (or equivalents) of the video stream prescaler outputs and the user 'labels' how the user thinks about what the video streams are.
 2. Allows the user to select, size, and position any of these inputs based on user 'labels' and system configuration constraints (as per Use Examples 1, 2, 3 and so on).
 3. Uses its cross-reference table (or other implementation of item 1) and the system configuration constraints to tell each video stream combiner which scaled video streams they require and how to further scale and position them to meet the requirements of item 2.
 4. Supports any additional features such as borders, aspect ratio adjustments, text and graphic overlays, etc.

Figure 7:
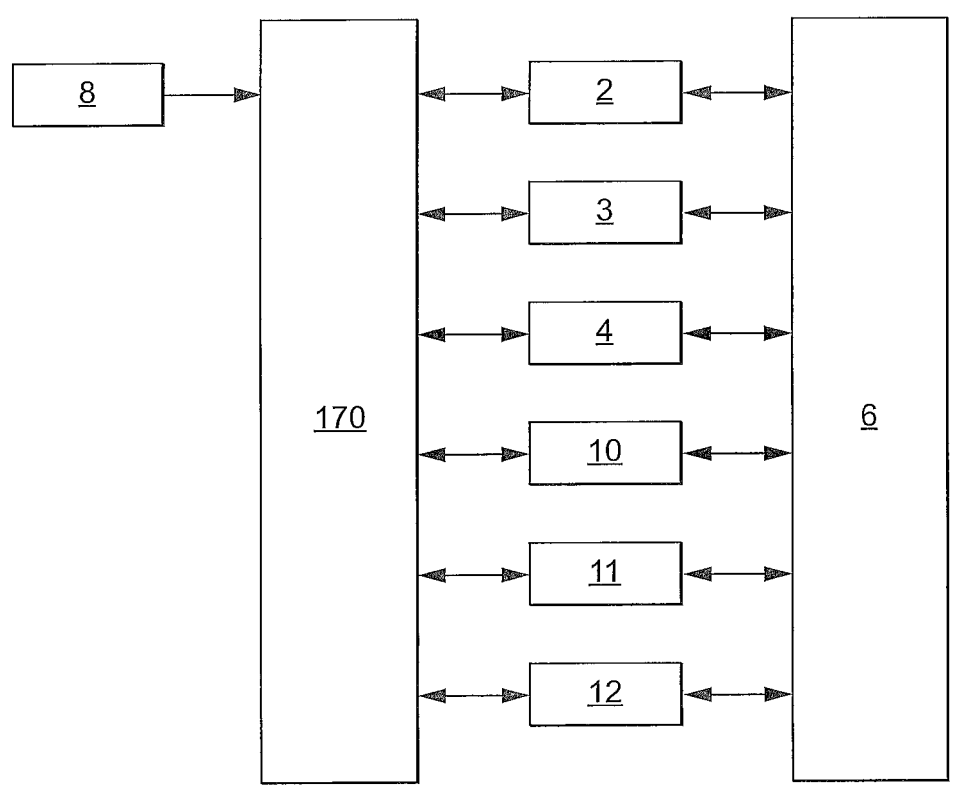
FIG. 7 shows possible connections between a control system of the multiviewer system of FIG. 1 or 6 and the prescaler and combiners of the system shown in FIG. 1.

FIG. 7 shows an alternative way of connecting the control module 8 to the prescalers 2-4 and the combiners 10-12. In this case, the control module 8 is connected to the control ports of the prescalers 2-4 and combiners 10-12 via a further packet data network 170.

Separate control and data networks as shown in FIG. 7 might be preferred because the network 6 used for video data may be heavily loaded with time-critical video data. The less predictable additional loading caused by control traffic might introduce uncertain latency in the video data propagation times.

Also, under some fault condition or unexpected operational situation, the network 6 might become overloaded with video traffic and start to operate slowly or unpredictably. In such circumstances the user will want to know that their control traffic will get through in a timely manner.

The system designer has to balance these issues against the additional cost and complexity of a second network.

There is no real requirement for control system 8 to be near the combiners, or for the combiners to be near each other. One advantage of a network based approach is that the physical location of items becomes much less important.

Typically, multiviewer control systems have some means of defining the current tiling pattern for the sub-images in a specific output stream. This may be by selecting from a predefined set, or by using a software based graphical tool to define a custom tiling. There is then a means of allocating input video streams to the various sub-images. These settings are then sent to the combiner either separately or together.

One hypothetical example would be that a user in (say) Newcastle controls a combiner in London to create a combined image of video signals of interest in a facility in London. The combined output is then routed across the network for display in Newcastle and in Birmingham.

This minimizes the long distance traffic, since only the control information and a single combined image have to travel a long way, while allowing remote monitoring of any video streams available to the multiviewer system in London.

Description of Alternative Implementation of the Prescaler

Figure 13:
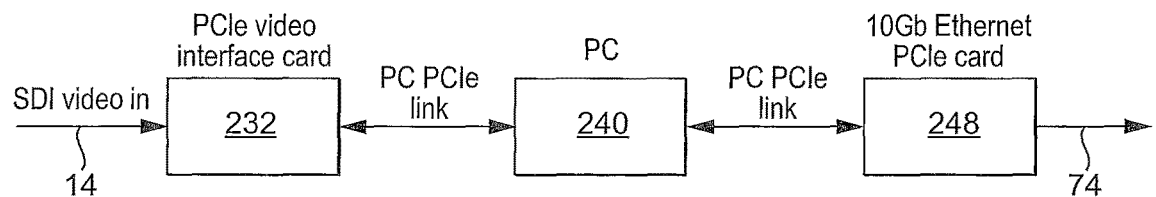
FIG. 13 is a block diagram of a second embodiment of prescaler in accordance with the invention.

An alternative implementation of a prescaler 10 is now described with reference to FIG. 13.

This prescaler implementation is based on a commercially available PC system 240 capable of supporting the required level of video processing. An input to the system is connected to a PCIe video interface card 232.

For simplicity this prescaler implementation is shown with a single SDI input although the video interface card 232 (https://www.blackmagicdesign.com/api/print/gb/products/decklink/techspecs/W-DLK-25?filename=decklink-4k-extreme-12g-techspecs.pdf&contntenttype-techspecs or similar) can support multiple inputs in a wide variety of formats.

This prescaler implementation connects to the packet switched network through a 10 Gb Ethernet link supported by a suitable PCIe card 248.

These functional modules are assembled as a standard PC system, with the PC 240 providing power and cooling for the input card 232 and the Ethernet card 248 in the usual way. The modules communicate using the PC motherboard PCIe links and their functions are supported by the PC operating system, the software supplied with the cards 232 and 248, and other widely available software.

The operation of this implementation of the prescaler 10 will now be described with reference to FIG. 3 the various blocks of which represent functions implemented within the hardware shown in FIG. 13.

The input video stream 14 supplied to the prescaler 10 may be in any one of a number of possible formats. More specifically, the stream might be an SDI video stream, as defined by SMPTE259, SMPTE292, or SMPTE424, further information on all of which are provided at https://en.wikipedia.org/wiki/Serial_digital_interface, or an HDMI 2.0 stream as described at http://www.hdmi.org/manufacturer/hdmi_2_0/. An alternative implementation using the 10 Gb Ethernet card 248 to receive the input would support an equivalent SDI stream carried as packetized data according to SMPTE2022-6 http://www.tvtechnology.com/insight/0083/smpte-and-the-future-of-video-over-ip/220188), or an uncompressed video-only packetized stream according to IETF RFC4175 (http://www.rfc-base.org/rfc-4175.html). In addition or as an alternative to either or both of the modules 232 and 248, the prescaler may have an input module that could accept another equivalent format for video input data or compressed video input data.

The stream 14 is decoded into a standard data format and placed into the PC memory space by input process 52. This is done as part of the standard operation of the video interface card 232, the software supplied with it, the operating system of the PC, and other widely available software running on the PC.

Software running in a standard way on the PC system functions as six video stream scalers 53-58, each of which performs a resolution reduction on each of the frames of the video stream. The video stream scalers reduce the video stream resolution by different amounts from each other, but the reduction performed by each scaler in this example will be the same in both spatial dimensions and does not vary with time.

Each reduced resolution video stream is fed from the respective scaler 53-58 to a data packetizer 60-65 which is also implemented within software running on the PC system. Working to RFC4175 or another packet-based video transport protocol or method, software running on the PC, functioning as the packetizers 60-65, generates packetized, scaled data streams 66-71 which are then processed by the steps represented by the functional block 72. Those steps comprise the formatting, handshaking and similar functions needed to transmit the packetized streams onto the packet-based data network 6 through the packet link 74. These are standard functions carried out in the usual way by the PC, the PC operating system and other standard software, and the 10 Gb Ethernet module 248 together with the software supplied with it.

Alternative Combiner Description.

Figure 14:
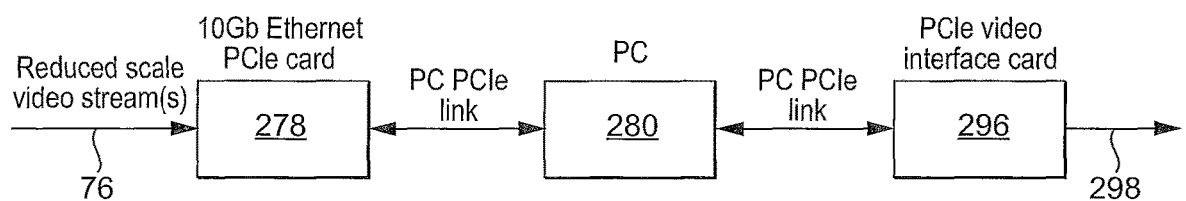
FIG. 14 is a block diagram of a second embodiment of combiner in accordance with the invention.

The operation of an alternative implementation of a combiner 2 is now described with reference to FIG. 14.

This combiner implementation is based on a commercially available PC system 280 capable of supporting the required level of video processing.

This combiner implementation connects to the packet switched network through a 10 Gb Ethernet link supported by a suitable PCIe card 278, and provides an output through a video interface card 296 connected to an output of the system 280.

For simplicity this combiner implementation is shown with a single SDI output 298 although the video interface card 296 (https://www.blackmagicdesign.com/api/print/gb/products/decklink/techspecs/W-DLK-25?filename=decklink-4k-extreme-12g-techspecs.pdf&contntenttype-techspecs or similar) can support multiple outputs in a wide variety of formats.

These functional modules are assembled as a standard PC based system, with the PC 280 providing power and cooling for the video interface card 296 and the Ethernet card 278 in the usual way. The modules communicate using the PC motherboard PCIe links and their functions are supported by the PC operating system, the software supplied with the Ethernet and Video I/O modules, and other widely available software.

The operation of this implementation of the combiner 2 will now be described with reference to FIG. 5 the various blocks of which represent functions implemented within the hardware shown in FIG. 14.

The combiner 2 receives data across the link 110 to the packet switched network 6. In this implementation the data consists of multiple scaled video streams packetised to RFC4175 or some similar protocol or standard and carried over the packet switched network 6. These video streams are received by the combiner 2 as a result of the action of the control system 8 on the relevant prescalers 10-12, the packet switched network 6, and the combiner 2. One method might be for the prescalers 10-12 to use IP multicast to send their scaled streams onto the network and the combiner 2 to join the relevant multicast groups on the basis of information provided to it by the control system 8. Alternatively the packet switched network 6 could be configured as a software defined network (https://en.wikipedia.org/wiki/Software-defined_networking) to achieve the same result with the operation of the prescalers 10-12 and the combiner 2 changed accordingly.

The 10 Gb Ethernet PCIe card 278, its associated software, the PC processor, and the PC software cooperate to receive and separate out the multiple scaled video streams into individual scaled video streams 114a-114z. These are further processed by software running on the PC system, implementing the functions depicted by blocks 116a-116z which present the scaled streams 118a-118z in an internal format suitable for further processing. The multiple scaled streams are then further processed by software implementing the functions illustrated by blocks 120a-120z. This processing may include further scaling if combiner output tiling has been configured to use sub-image sizes different from those in the incoming scaled video streams as described in Use Example 2 and Use Example 3. This processing may also include dynamically variable scaling of the various sub-images, for example when the control system changes the output tiling from one arrangement to another in a smooth progression rather than by an abrupt change, a method of operation commonplace in multiviewers based on exclusively video technology.

The video processors 120a-120z produce a set of video streams 122a-122z that are used by the video memory and layering engine 124, which is implemented in software running on the PC system. This creates the fully combined video stream 126. The PC 280, the SDI output card 296 and their associated software then cooperate to output the video stream 126 as a fully formatted SDI video stream 130 for display on a local monitor, or for input into an SDI video based routing system.

Figure 15:
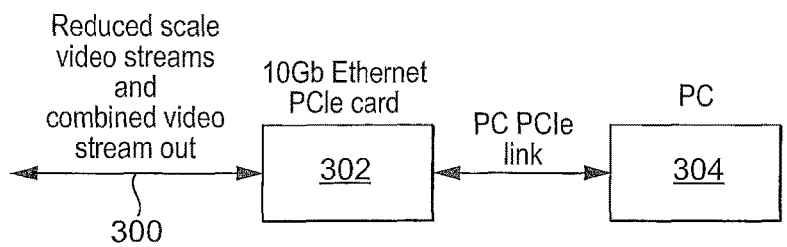
FIG. 15 is a block diagram of a third embodiment of combiner in accordance with the invention.

A further alternative implementation of a combiner 2 is now described with reference to FIG. 15.

This combiner implementation is based on a commercially available PC system 304 capable of supporting the required level of video processing.

This combiner implementation connects to the packet switched network through a 10 Gb Ethernet link supported by a suitable PCIe card 302, installed as part of the PC based system.

The link 300 to the packet switched network is used both to input the scaled video streams from the relevant prescalers and to output the combined video stream back into the packet switched network.

Much of this implementation is functionally similar to the one described previously. Instead of the combined video stream output being transformed to an SDI stream by dedicated hardware and associated software, the combined video stream output is formatted using standard software methods to SMPTE 2022-6, or RFC4175, or some other appropriate protocol and sent via the Ethernet card 302 and the link 300 into the packet switched network 6 to be used as appropriate for the operation of the overall system.

The invention claimed is:

1. A video multiviewer system for use in simultaneous viewing, at a viewing location, of video streams from multiple video sources, the system comprising at least one video prescaler for deriving from each of multiple video input streams a respective set of multiple scaled video streams, at least some of the scaled video streams being of a different scale from that of the respective video input stream, the system further comprising a video stream combiner programmed or arranged to combine selected scaled video streams to enable the selected scaled video streams to be displayed at the viewing location, wherein the video stream combiner and the at least one video prescaler are programmed or arranged to be linked together, in use, by a packet switched network via which said selected scaled video streams are relayed to the video stream combiner, wherein the at least one video prescaler is programmed or arranged to derive and output a set of multiple scaled video streams simultaneously from a respective single video input stream, and simultaneously feed the scaled video streams to the packet switched network.

2. The system according to claim 1, in which the at least one video prescaler and the video stream combiner are programmed or arranged to be linked together by means of a packet switched Internet Protocol network.

3. The system according to claim 1, in which the video stream combiner is arranged to provide a combined video data output stream, containing video data from the selected scaled video streams, for display on a common display device.

4. The system according to claim 1, in which the at least one video prescaler is programmed or arranged to derive, from at least one of the video input streams, a respective scaled video stream, all frames of which are scaled by the same amount.

5. The system according to claim 1, in which the at least one video prescaler is programmed or arranged to derive, from at least one of the video input streams, a scaled video stream having a constant frame rate.

6. The system according to claim 5, in which all of the scaled video streams have the same frame rate.

7. The system according to claim 1, in which the at least one video prescaler comprises a video stream prescaler programmed or arranged so that said set of multiple scaled video streams is generated by that video stream prescaler.

8. The system according to claim 1, in which the at least one video prescaler is so programmed or arranged that the set of scaled video streams are scaled to proportions, relative to the video input stream, that define one or more geometric series.

9. The system according to claim 8, in which the common ratio of each of the one or more geometric series is ½, ⅔ or ¾.

10. The system according to claim 1, in which the at least one video prescaler and the video stream combiner are programmed or arranged to co-operate over the packet switched network, in which the scaled video streams are selectively received from the packet switched network by the combiner.

11. The system according to claim 7, in which the video stream prescaler is one of a plurality of such video stream prescalers of the system.

12. The system according to claim 1, in which the video stream combiner is one of a plurality of such video stream combiners of the system.

13. The system according to claim 1, in which the video stream combiner has a plurality of outputs for a combined video stream.

14. The system according to claim 13, in which the video stream combiner is programmed or arranged to produce the combined video stream in a plurality of different formats, each at a respective output.

15. A prescaler for the video multiviewer system according to claim 1, the prescaler being programmed or arranged to derive, from an input video stream, one or more scaled video streams and to feed one or more scaled video streams to a packet switched network, for reception by a video stream combiner of the video multiviewer system.

16. The prescaler according to claim 15, in which the prescaler is programmed or arranged to generate a set of scaled video streams, each derived from said input video stream, the scaled video streams being of differing proportions of the input video stream, the prescaler also being programmed or arranged to feed the scaled video streams to the packet switched network substantially simultaneously.

17. The video multiviewer system according to claim 1, further comprising a packet switched network linking the at least one video prescaler and the video stream combiner;
- wherein the at least one video prescaler is programmed or arranged to derive, from an input video stream, multiple scaled video streams and to feed said multiple scaled video streams to the packet switched network; and
- wherein the video stream combiner is programmed or arranged to receive from the packet switched network one or more of the multiple scaled video streams fed to the packet switched network by the at least one video prescaler, and to combine the selected scaled video streams to produce a combined video stream which incorporates videos carried on the selected scaled video streams, for display on a display device.

18. A method of simultaneously presenting, at a viewing location, video streams from multiple sources, the method comprising the steps of:
- (a) generating from each of a number of input video streams a respective set of multiple scaled video streams, at least some of which are of a different scale from that of the respective input video stream, the streams of each set being generated simultaneously, each set of multiple scaled video streams being derived from a respective single one of the input video streams;
- (b) ensuring that the format of the scaled video streams is in accordance with the requirements of a packet switched network, to allow transmission of the scaled video streams across the packet switched network;
- (c) feeding the scaled video streams to the packet switched network substantially simultaneously;
- (d) receiving selected scaled video streams from the packet switched network;
- (e) combining the selected scaled video streams to create a combined video stream which incorporates videos carried on the selected scaled video streams; and
- (f) supplying said combined selected scaled video streams to a display device for display thereon.

\* \* \* \* \*